US011835631B2

(12) United States Patent
Gum et al.

(10) Patent No.: US 11,835,631 B2
(45) Date of Patent: Dec. 5, 2023

(54) DEVICES AND TECHNIQUES FOR IMPROVING RECEPTION OR COMPENSATING FOR ATTENUATION OF GNSS SIGNALS DURING WATER IMMERSION ACTIVITIES

(71) Applicant: QUALCOMM Incorporated, San Diego, CA (US)

(72) Inventors: Arnold Jason Gum, San Diego, CA (US); Zoltan Biacs, San Mateo, CA (US); Rayman Wai Pon, Cupertino, CA (US); David Tuck, San Juan Capistrano, CA (US); Bo Zheng, Sunnyvale, CA (US); Jeffrey Wong, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/201,415

(22) Filed: Mar. 15, 2021

(65) Prior Publication Data
US 2022/0291393 A1    Sep. 15, 2022

(51) Int. Cl.
*G01S 19/19*    (2010.01)
(52) U.S. Cl.
CPC ................... *G01S 19/19* (2013.01)
(58) Field of Classification Search
CPC ..................................................... G01S 19/19
See application file for complete search history.

(56) References Cited

U.S. PATENT DOCUMENTS 6,097,974 A * 8/2000 Camp, Jr. ............ H04B 1/3805
370/342
8,868,144 B2 * 10/2014 Shi ........................ H01Q 1/243
455/277.1
(Continued)

FOREIGN PATENT DOCUMENTS

CA    2989165 A1 * 12/2016 ............. H01F 38/14
EP    3009169         4/2016
(Continued)

OTHER PUBLICATIONS

International Search Report and Written Opinion—PCT/US2022/070287—ISA/EPO—dated May 6, 2022.

*Primary Examiner* — Timothy A Brainard
*Assistant Examiner* — Hailey R Le
(74) *Attorney, Agent, or Firm* — QUALCOMM Incorporated

(57) ABSTRACT

A wearable device that can receive a plurality of Global Navigation Satellite System (GNSS) timing signals using an antenna, where the antenna is located in an exterior portion of the wearable device such that the antenna receives GNSS signals at the external portion of the wearable device, without the GNSS signals first passing through an air gap within a housing of the wearable device. The wearable device is configured to determine a geographic location of the wearable device based at least in part on the GNSS signals. The wearable device is configurable to perform underwater dead-reckoning procedures, measuring energy levels during dwell periods, measuring efficiency of swim strokes, sharing wearable device information with other electronic devices, calibrating the wearable device, or a combination thereof.

26 Claims, 15 Drawing Sheets

(56) References Cited

U.S. PATENT DOCUMENTS

| | | | | |
|---|---|---|---|---|
| 10,742,250 B1* | 8/2020 | Hiemstra | | H04B 5/0081 |
| 2003/0008667 A1* | 1/2003 | Forrester | | H04B 1/3805 |
| | | | | 455/456.1 |
| 2006/0146712 A1* | 7/2006 | Conner | | H04L 47/14 |
| | | | | 370/408 |
| 2011/0128824 A1* | 6/2011 | Downey | | G01S 19/35 |
| | | | | 368/14 |
| 2012/0194976 A1* | 8/2012 | Golko | | H04M 1/0254 |
| | | | | 361/679.01 |
| 2012/0299785 A1* | 11/2012 | Bevelacqua | | H01Q 13/10 |
| | | | | 343/702 |
| 2014/0156228 A1* | 6/2014 | Molettiere | | A61B 5/1112 |
| | | | | 702/189 |
| 2014/0225786 A1* | 8/2014 | Lyons | | H01Q 1/273 |
| | | | | 343/702 |
| 2015/0180514 A1* | 6/2015 | Pavacic | | H04B 1/0064 |
| | | | | 455/552.1 |
| 2015/0253120 A1* | 9/2015 | Meschter | | G09B 5/02 |
| | | | | 702/141 |
| 2016/0101323 A1* | 4/2016 | Erkkila | | A63B 24/0062 |
| | | | | 701/466 |
| 2016/0254598 A1* | 9/2016 | Sheynblat | | H04B 7/0805 |
| | | | | 455/277.1 |
| 2016/0268678 A1* | 9/2016 | Agardh | | G01S 19/426 |
| 2017/0135315 A1* | 5/2017 | Marmen | | A01K 27/001 |
| 2018/0014102 A1* | 1/2018 | Hirsch | | H04R 1/1016 |
| 2018/0062249 A1* | 3/2018 | Sung | | H01Q 1/241 |
| 2018/0294548 A1* | 10/2018 | Kang | | H01Q 9/0421 |
| 2018/0342794 A1* | 11/2018 | Han | | H04B 1/18 |
| 2019/0096129 A1* | 3/2019 | Rhodes | | G06F 3/011 |
| 2019/0341677 A1* | 11/2019 | Hsu | | A44C 5/0007 |
| 2020/0020221 A1* | 1/2020 | Cutler | | H04W 4/70 |
| 2020/0021008 A1* | 1/2020 | Yong | | H01Q 21/005 |
| 2020/0052387 A1* | 2/2020 | Son | | G04G 21/02 |
| 2020/0365974 A1* | 11/2020 | Wei | | H01Q 9/42 |
| 2020/0389203 A1* | 12/2020 | Luo | | H04B 1/40 |

FOREIGN PATENT DOCUMENTS

| | | |
|---|---|---|
| EP | 3609020 | 2/2020 |
| WO | WO 2015164944 | 11/2015 |

* cited by examiner

DEVICES AND TECHNIQUES FOR IMPROVING RECEPTION OR COMPENSATING FOR ATTENUATION OF GNSS SIGNALS DURING WATER IMMERSION ACTIVITIES

BACKGROUND

Use of electronic devices for tracking open water swim path and measure total distances is gaining in popularity. However, Global Navigation Satellite System (GNSS) signals do not penetrate water well. Therefore, electronic devices (e.g., wearable devices) generally have difficulty in receiving navigation signals during in-water activities, especially those activities in which the electronic device is underwater for at least some periods of time (e.g., during a swimming stroke). For example, current open water features on commercially available devices do not work well for swim strokes such as the breaststroke where the user's hand with a wearable device does not break the surface of the water for much of the stroke. The water attenuation issue results in a trace of GNSS fixes jumping around for some commercially available wearable devices during periods of time when the device is in water.

SUMMARY

According to some implementations, a method may include receiving a plurality of Global Navigation Satellite System (GNSS) timing signals using an antenna of a wearable device, where the antenna is located in an exterior portion of the wearable device such that the antenna faces away from a body of a user that wears the wearable device to receive the plurality of GNSS signals (without the plurality of GNSS signals first passing through an air gap within a housing of the wearable device); determining a geographic location of the wearable device based at least in part on the plurality of GNSS signals; and storing the geographic location in a memory of the wearable device. According to some implementations, the antenna may be incorporated into a bezel of the wearable device. In some embodiments, the antenna may be incorporated into a crown of the wearable device. In some embodiments, the antenna may be incorporated into a band of the wearable device. In some embodiments, the antenna may be incorporated into the face or crystal of the wearable device as a mesh antenna.

According to some embodiments, the method can include accessing a plurality of stored geographic points stored in the memory of the wearable device, wherein the stored geographic points define a swim lane. The method can include determining whether the geographic location of the wearable device is outside the defined swim lane. The method can include providing feedback to a user indicating the geographic location of the wearable device is outside the swim lane. In various embodiments, the feedback can comprise haptic feedback. In some embodiments, the feedback can comprise audio feedback.

According to some embodiments, the method can include storing a plurality of geographic locations and associated times in the memory of the wearable device. The method can include calculating one or more characteristics of the water immersion activities based at least in part on the plurality of geographic locations and the associated times.

According to some embodiments, the method can include sending, via a wireless link, the geographic location of the wearable device to an electronic device.

According to some embodiments, the wearable device comprises a casing configured to be removably coupled to user equipment or clothing.

According to certain embodiments, a wearable device may include a body including a hermetically sealed case and an exterior portion. The device may also include a processing circuit housed in the hermetically sealed case and an antenna electrically coupled to the processing circuit. The antenna is located at the exterior portion of the body such that, during operations of the wearable device, the antenna faces outwardly to receive a plurality of GNSS signals at the exterior portion of the body and feeds the plurality of GNSS signals to the processing circuit.

In some embodiments of the wearable device, the exterior portion of the body may include a crown of the wearable device, a circumferential portion of the case, a portion of a band of the wearable device, or a combination thereof. In some embodiments, the exterior portion of the body may include a cover that is at least partially transparent to visible light, and the antenna may include an antenna attached to a surface of the cover or embedded in the cover. The antenna attached to the surface of the cover or embedded in the cover may include a mesh, a loop, an inverted f antenna, a directional antenna, an omnidirectional antenna, or a combination thereof. The surface may include an interior surface or an exterior surface.

In some embodiments, the antenna may be further configured to receive a Wide Area Network (WAN) signal, a Wi-Fi signal, or both; and the wearable device may further include a filter configured to isolate the plurality of GNSS signals from the WAN signal, the Wi-Fi signal, or both. In some embodiments, the antenna may be further configured to receive a WAN signal, a Wi-Fi signal, or both; and the wearable device may further include an inertial measurement unit configured to measure an orientation of the wearable device and a switch configured to select, based on the orientation of the wearable device, the plurality of GNSS signals, the WAN signal, the Wi-Fi signal, or both the WAN signal and the Wi-Fi signal to feed to the processing circuit.

In some embodiments, the antenna may be electrically coupled to the processing circuit by capacitive coupling or via a conductive wire embedded in the body. The antenna may be electrically coupled to the processing circuit through a low noise amplifier. The antenna may include a circular antenna, a ring-shaped antenna, a patch antenna, a microstrip antenna, a coil antenna, or an antenna array. The antenna may include a ground plane configured to be in physical contact with a skin of a user that wears the wearable device.

In some embodiments, the processing circuit may be configured to determine a geographic location of the wearable device based at least in part on the plurality of GNSS signals. In some embodiments, the processing circuit may further be configured to: access information regarding a plurality of geographic points that define a geographic zone; determine, based on the plurality of geographic points, that the geographic location is outside the geographic zone; and provide, in response to determining that the wearable device is outside the geographic zone, feedback to a user of the wearable device. In some embodiments, the feedback may include haptic feedback, audio feedback, visible feedback, or a combination thereof. In some embodiments, the processing circuit may further be configured to send, via a wireless link, the geographic location of the wearable device to an external electronic device. In some embodiments, the processing circuit may be configured to track the geographic location of the wearable device and determine, based on tracking the geographic location of the wearable device, one or more characteristics of a user of the wearable device, where the user is at least partially in water. In some embodiments, the body of the wearable device may be configured to be removably attached to swim goggles, a wetsuit, a head band, or a neck of a user. In some embodiments, the wearable device may include a pressure sensor configured to measure a depth of the wearable device in water.

According to some implementations, a method may include receiving a plurality of Global Navigation Satellite System (GNSS) timing signals via an antenna embedded in a wearable device. The method can include calculating a plurality of geographic locations over time of the wearable device based at least in part on the plurality of GNSS signals. The method can include storing the geographic locations and associated time stamps in a memory of the wearable device. The method can include measuring a depth of the wearable device using a pressure sensor on the wearable device that correlates a detected pressure to the depth. If the measured depth exceeds a threshold depth, the method can include determining a historical speed of the wearable device based at least on the geographic locations and the associated times saved in the memory of the wearable device. The method can include determining a direction of motion of the wearable device based at least in part on a magnetic signature received on a magnetometer of the wearable device. The method can include determining one or more underwater geographic locations of the wearable device over time using the historical speed and the direction of motion. The method can include saving the one or more underwater geographic locations of the wearable device to the memory.

According to some implementations, a method may include detecting a second plurality of GNSS signals at the antenna of the wearable device. The method can include calculating an updated position of the wearable device based at least in part of the second plurality of GNSS signals. The method can include storing the updated position of the wearable device in the memory.

According to some implementations, a method may include generating a message comprising a calculated speed, the determined geographic location, the determined direction of motion, or a combination thereof. The method can include sending via a wireless protocol the message to a second electronic device.

According to some implementations, a method may include receiving a plurality of Global Navigation Satellite System (GNSS) timing signals using an antenna embedded in a wearable device. The method can include measuring a first received energy of the GNSS signals during a first dwell period. The method can include measuring a second received energy of the GNSS signal during a plurality of secondary dwell periods, wherein a duration of each of the plurality of secondary dwell periods is shorter than the first dwell period. The method can include storing the second received energy in a memory based at least in part on the second received energy exceeding a first threshold level. Based on whether the first received energy is below the second threshold level, the method can include harvesting accumulated energy from the plurality of secondary dwell periods in or near a center bin to determine a location for the wearable device; and storing one or more characteristics of the GNSS signals for the secondary dwell periods in the memory.

According to some implementations, a method may include receiving a plurality of sensor signals from one of more sensors in the wearable device. The method can include determining based in part on the sensor signals a position of the wearable device during a swimming stroke. The method can include scheduling a time period for measuring the GNSS signals based at least in part on the position of the wearable device during the swimming stroke.

According to some implementations, a method may include receiving a plurality of Global Navigation Satellite System (GNSS) timing signals using an antenna, wherein the antenna is located in an exterior portion of a wearable device such that the antenna detects the plurality of GNSS signals without the plurality of GNSS signals first passing through an air gap within a housing of the wearable device; calculating one or more geographic locations over a period of time of the wearable device based at least in part on the received GNSS signals. The method can include measuring one or more depths of a wearable device over the period of time using a pressure sensor on the wearable device. The method can include storing the one or more geographic locations. The method can include the one or more depths over the period of time in a memory of the wearable device.

According to some implementations, a method may include sending the one or more geographic locations, the one or more depths, or both over the period of time to an electronic device via a wireless protocol.

According to some implementations, a method may include receiving a plurality of Global Navigation Satellite System (GNSS) timing signals using an antenna, wherein the antenna is located in an exterior portion of a wearable device such that the antenna detects the plurality of GNSS signals without the plurality of GNSS signals first passing through an air gap within a housing of the wearable device. The method can include calculating a plurality of geographic locations of the wearable device during a time period based at least in part on the received GNSS signals. The method can include storing the plurality of geographic locations and associated times of the wearable device in a memory. The method can include determining motion of the wearable device during the time period based on the plurality of geographic locations and the associated times. The method can include receiving wireless signals containing a plurality of acceleration signals from one or more MEMS sensors worn on one or more limbs of a user; determining a movement of the one or more limbs of a user during the time period based in part on the acceleration signals. The method can include calculating an efficiency of a stroke based at least in part on the movement of the one or more limbs of the user and the motion of the wearable device during the time period; and storing the efficiency of the stroke in the memory.

According to some implementations, a method may include receiving a plurality of Global Navigation Satellite System (GNSS) timing signals using an antenna, wherein the antenna is located in an exterior portion of a wearable device such that the antenna detects the plurality of GNSS signals without the plurality of GNSS signals first passing through an air gap within a housing of the wearable device; calculating a plurality of geographic locations of the wearable device during a time period based at least in part on the plurality of GNSS signals; storing the plurality of geographic locations of the wearable device and associated times in a memory of the wearable device; generating one or more data messages comprising the plurality of geographic locations of the wearable device and the associated times; and sending the one or more data messages to a second device via a sidelink data channel.

According to some implementations, a method may include receiving via the sidelink data channel one or more second data messages from one or more second wearable devices, wherein the one or more second data messages comprise the geographic locations of the one or more second wearable devices.

According to some implementations, a method may include providing feedback via the wearable device based in part on the geographic locations of the one or more second wearable devices.

According to some implementations, a method may include receiving a plurality of Global Navigation Satellite System (GNSS) timing signals using an antenna, wherein the antenna is located in an exterior portion of a wearable device such that the antenna detects the plurality of GNSS signals without the plurality of GNSS signals first passing through an air gap within a housing of the wearable device; calculating a plurality of geographic locations of the wearable device over a time period based at least in part on the received GNSS signals. The method can include storing the plurality geographic locations of the wearable device and associated times in a memory of the wearable device. The method can include measuring an elapsed time for swimming a known distance. The method can include comparing the geographic locations and the associated time stamps with the elapsed time and the known distance to determine a calibration error; and storing the calibration error in the memory.

According to an aspect of the disclosure, a wearable device comprising a communication interface, a memory, and one or more processing units communicatively coupled with the communication interface and memory and configured to cause the wearable device to perform the method of any of the methods described above.

According to an aspect of the disclosure, a non-transitory computer-readable medium comprising a plurality of instructions stored in a memory, the plurality of instructions when executed on a processor perform operations comprising the method of any of the methods described above.

These and other embodiments are described in detail below. For example, other embodiments are directed to systems, devices, and computer readable media associated with methods described herein.

A better understanding of the nature and advantages of embodiments of the present disclosed may be gained with reference to the following detailed description and the accompanying drawings.

Figure 1:
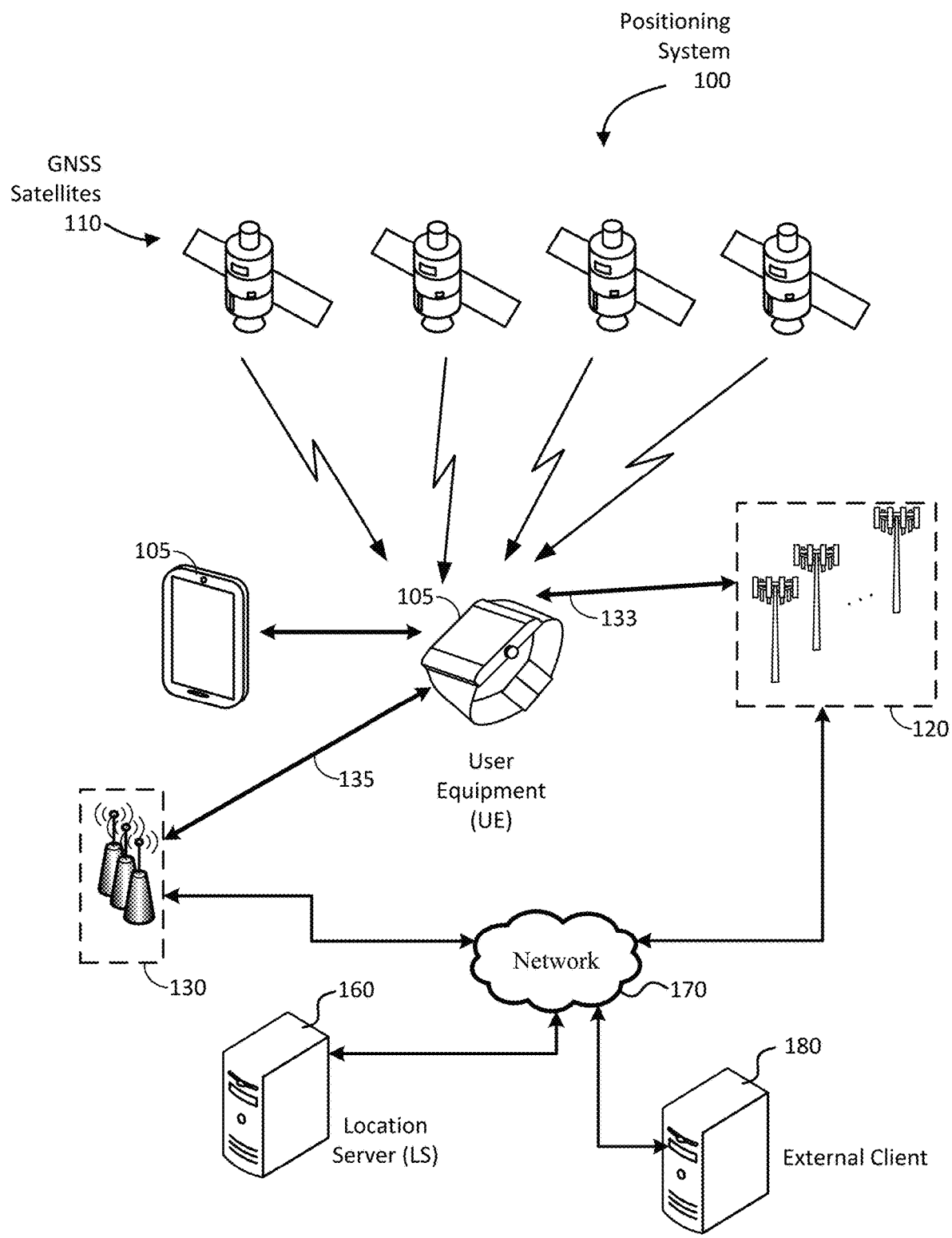
FIG. 1 is a diagram of a positioning system, according to an embodiment.

Like reference, symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc., or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used, and various modifications may be made without departing from the scope of the disclosure or the spirit of the appended claims.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The following detailed description of example implementations refers to the accompanying drawings. The same reference numbers in different drawings may identify the same or similar elements.

FIG. 1 is a simplified diagram of a positioning system 100 in which a user equipment (UE) 105, a location server (LS) 160, and/or other components of the positioning system 100 can use the techniques provided herein for determining an estimated location of a UE 105, according to an embodiment. In some embodiments, a UE 105 can be a wearable device. The techniques described herein may be implemented by one or more components of the positioning system 100. The positioning system 100 can include one or more UE 105, one or more satellites 110 (also referred to as space vehicles (SVs)) for a Global Navigation Satellite System (GNSS) such as the Global Positioning System (GPS), base stations 120, access points (APs) 130, LS 160, a network 170, and an external client 180.

It should be noted that FIG. 1 provides only a generalized illustration of various components, any or all of which may be utilized as appropriate, and each of which may be duplicated as necessary. Specifically, although only one wearable device is illustrated, it will be understood that many wearable devices may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to LS 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Particular examples of network 170 include a Long Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120 may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, a UE 105 can send and receive information with network-connected devices, such as LS 160, by accessing the network 170 via a base station 120 using a first communication link 133. Additionally or alternatively, because APs 130 also may be communicatively coupled with the network 170, UE 105 may communicate with Internet-connected devices, including LS 160, using a second communication link 135.

As used herein, the term "base station" may generically refer to a single physical transmission point, or multiple co-located physical transmission points, which may be located at a base station 120. Physical transmission points may comprise an array of antennas (e.g., as in a Multiple Input-Multiple Output (MIMO) system and/or where the base station employs beamforming) of the base station. The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE 105 and a neighbor base station whose reference radio frequency (RF) signals the UE 105 is measuring.

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The LS 160 may comprise a server and/or another computing device configured to determine an estimated location of UE 105 and/or provide data (e.g., "assistance data") to UE 105 to facilitate the location determination. According to some embodiments, LS 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in LS 160. In some embodiments, the LS 160 may comprise, a Discovered SLP (D-SLP) or an Emergency SLP (E-SLP). The LS 160 may also comprise an Enhanced Serving Mobile Location Center (E-SMLC) that supports location of UE 105 using a control plane (CP) location solution for LTE radio access by UE 105. The LS 160 may further comprise a Location Management Function (LMF) that supports location of UE 105 using a control plane (CP) location solution for 5G or NR radio access by UE 105. In a CP location solution, signaling to control and manage the location of UE 105 may be exchanged between elements of network 170 and with UE 105 using existing network interfaces and protocols and as signaling from the perspective of network 170. In a UE location solution, signaling to control and manage the location of UE 105 may be exchanged between LS 160 and UE 105 as data (e.g. data transported using the Internet Protocol (IP) and/or Transmission Control Protocol (TCP)) from the perspective of network 170.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may also be specified as a geodetic location (as a latitude and longitude) or as a civic location (e.g. in terms of a street address or using other location related names and labels). A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g., may be accessed by a user of UE 105) or may be a server, application, or computer system providing a location service to some other user or users which may include obtaining and providing the location of UE 105 (e.g., to enable a service such as friend or relative finder, asset tracking or child or pet location). Additionally or alternatively, the external client 180 may obtain and provide the location of UE 105 to an emergency services provider, government agency, etc.

The GNSS satellites 110 can be one or more transmitting devices such as satellite positioning systems (SPSs) that may transmit SPS signals from one or more space vehicles (SVs) for use in wireless signal-based positioning. In some embodiments, an SPS may, for example, comprise a GNSS, such as the GPS or Galileo satellite systems. In other embodiments, one or more SVs may be from multiple GNSS such as, but not limited to, GPS, Galileo, Glonass, or Beidou (Compass) satellite systems. In other embodiments, one or more SVs may be from any one of several regional navigation satellite systems (RNSSes) such as, for example, Wide Area Augmentation System (WAAS), European Geostationary Navigation Overlay Service (EGNOS), Quasi-Zenith Satellite System (QZSS), just to name a few examples. In yet another example, one or more other devices may represent one or more terrestrial-based wireless transmitting devices, such as, e.g., a dedicated positioning Beacon transmitting device, an access point (AP) device which may be part of a wireless local area network, a base transceiver station which may be part of the cellular telephone system, and/or the like or some combination thereof.

Figure 2:
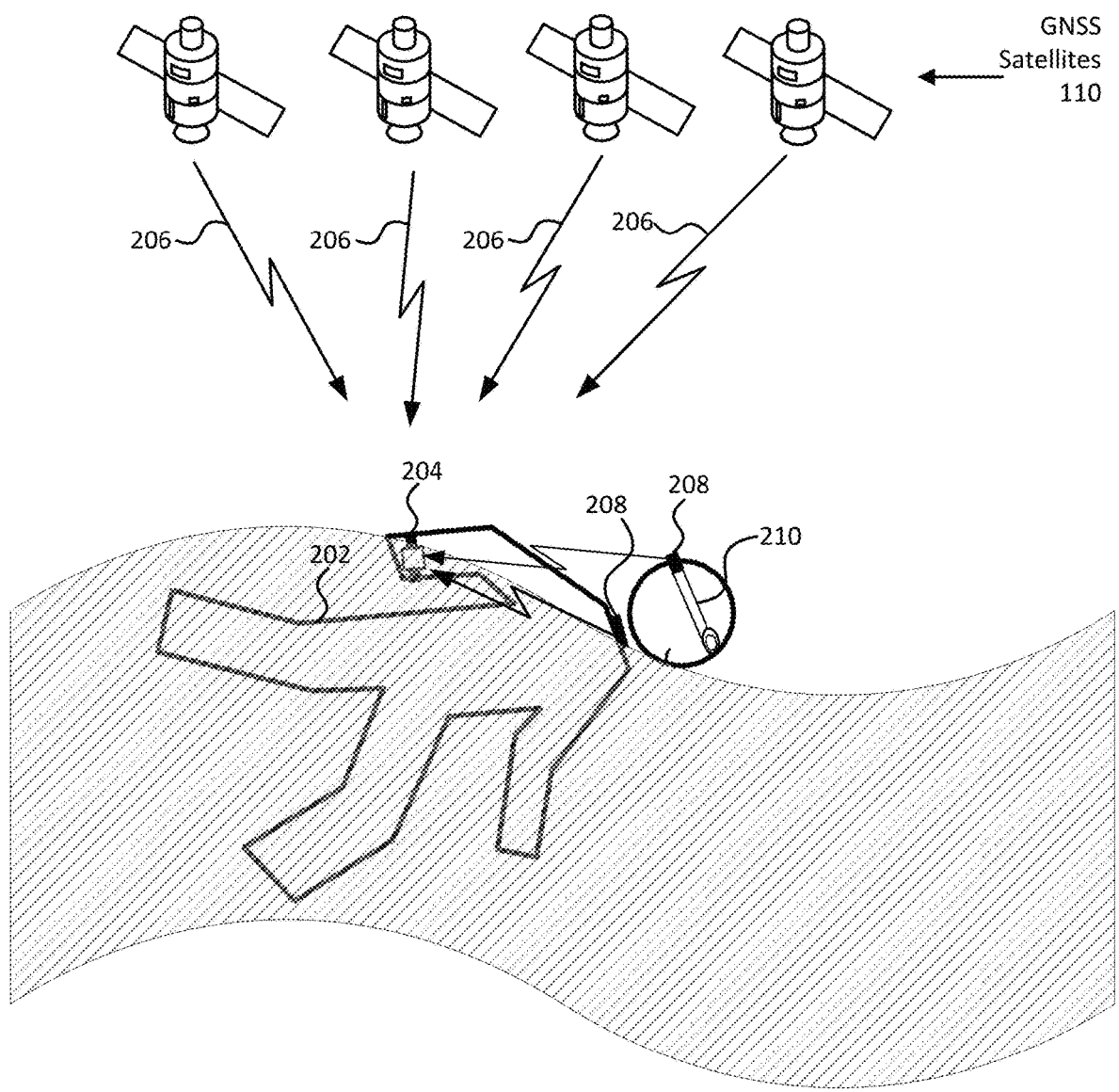
FIG. 2 illustrates a user with a wearable device.

FIG. 2 illustrates a user 202 with a wearable device 204. The wearable device 204 can include but is not limited to an electronic or smart watch. Wearable devices 204 are increasingly designed to operating in a water environment and can be water resistant to a certain depth (e.g., 50 meters). However, navigation features that rely on GNSS signals 206 from a plurality of satellites 110 often do not function properly when the wearable device 204 is underwater because the GNSS signals 206 may be largely reflected off the interface between air and water and thus can only penetrate water for a short distance (e.g., a few inches). As the user's arms move, the device can enter and leave the water and reception of the GNSS signals 206 may be intermittent at best. In traveling from the satellites 110, GNSS signals 206 pass through several boundaries that reduce the signal-to-noise ratio. A first air-to-water exists from the GNSS signals passing through the surface of the water. A portion of the GNSS signals 206 can be reflected off the surface of the water at the water-to-air boundary. A second boundary exists from the outer housing of the wearable device 204 to a GNSS antenna normally mounted on or connected to a printed circuit board (PCB) inside the housing of the wearable device. This water-to-air boundary affects GNSS signals 206 that pass from the water to the GNSS antenna of the wearable device 204. As described herein, the disclosed techniques improve the signal-to-noise ratio of GNSS signals 206 reaching the antenna of a GNSS receiver of the wearable device 204.

Other techniques to compensate for intermittent fixes caused by the attenuation of GNSS signals is to filter the received signal through an averaging filter or a Kalman filter that is also receiving acceleration data, gyro data, or magnetometer data from one or more sensors on the wearable device 204. For example, the magnetometer can inform the device about the portion of the stroke for determining times to receive GNSS data.

In various embodiments, the attenuation of the GNSS signals may be reduced by avoiding the water-to-air boundary, for example, by positioning the GNSS antenna at an exterior of the wearable device 204 rather than in the interior of wearable device 204. Positioning the GNSS antenna at an exterior of the device (rather than on the PCB inside the housing) may improve the signal-to-noise ratio of the received GNSS signals 206. In some embodiments, wearable device 204 may include two or more antennas that are capable of receiving GNSS signals and are connected to a GNSS receiver (e.g., on the PCB) via, for example, switches. The two or more antennas may both be positioned at the exterior of wearable device 204 or may include at least one antenna at the exterior of wearable device 204 and at least one antenna inside the housing of wearable device 204.

An antenna that is out of water and/or receives a stronger GNSS signal may be selected from the two or more antennas and connected to the GNSS receiver through a switch.

In various embodiments, a second electronic device 208 can be removably coupled to a portion of a user's equipment, body, or clothing that remains outside of the water or is at least periodically (or aperiodically) outside of the water to improve GNSS signal 206 reception. For example, the second electronic device 208 can be coupled to the back of a user's goggles 210, a mask (not shown), a snorkel (not shown), a headband (not shown), or a swim cap (not shown). In other embodiments, the second electronic device 208 can be coupled to a user's clothing (e.g., a wet suit, a rash guard, a swim shirt). The second electronic device 208 can preferably be coupled to an upper portion of the clothing so it can maximize the reception of GNSS signals 206. In some embodiments, the second electronic device 208 can be attached to a band that can be wrapped around an upper torso of a user.

The second electronic device 208 can include an antenna, a GNSS receiver, a power source (e.g., a battery), a processor, a wireless transceiver, and a memory. The second electronic device 208 can include a clip to attach to a user's equipment or clothing. The data collected by the second electronic device 208 can include radio frequency signals (boosted), intermediate frequency (IF) data, I/Q data that shows the changes in magnitude (or amplitude) and phase of a sine wave (digitized), pseudo ranges, and calculated locations. In various embodiments, the location data can be filtered in real time to account for heading (using magnetometer or GNSS location), current drift, and location history.

Another advantage of collecting the GNSS information at a second electronic device 208 is to avoid the Doppler issue associated with the user moving the arms during the swim strokes. The head and the top of the torso would have much less Doppler effect associated with the movement of the body during swimming as compared with the movement of the arm.

The location data collected by the second electronic device 208 can be sent via a peer-to-peer wireless protocol (e.g., Bluetooth, LTE direct, WiFi Direct, PC5, ultra-wideband (UWB), etc.) to the wearable device 204 continuously or periodically. In some embodiments, the location data can be opportunistically sent to the wearable device 204 when the wearable device 204 is out of the water. In some embodiments, wearable device 204 may obtain location data collected by the second electronic device 208 (e.g., GNSS signals received by second electronic device 208), and selectively use the GNSS signals received by the antenna on wearable device 204, location data (e.g., GNSS signals) collected by second electronic device 208, or both for positioning for a given time window. In some embodiments, the second electronic device 208 can batch and store the location data and send the location data to the wearable device 204 (e.g., a smart watch) when the swim session has been completed. In some embodiments, an emergency mode may override normal communication protocols to transfer the location data to the wearable device 204 in drowning situations or situations with strong currents, storms, or a particular user interface setting. Many wearable devices 204 have Wide Area Network (WAN) capabilities that would allow the wearable devices 204 to connect with emergency services.

In some implementations, wearable device 204 (e.g., a smart watch) and second electronic device 208 (e.g., on or in goggles 210) may detect, identify, authenticate (if needed), and/or communicate with each other, and one or both of them may be selected for GNSS searching based on the quality of the GNSS signals received by the two devices or other featured detected by sensors on the user. For example, if certain open-water swim features (e.g., a swimming pool, a beach, etc.) are detected by goggles 210 or other sensors (e.g., a camera) on the user, the GNSS measurements may be transferred to goggles 210, a facemask, or other devices (e.g., a floating buoy) that may be at least periodically out of the water. In one smart watch (or smartphone) centric implementation, certain open-water swim features may be configured on the smart watch. When goggles and the open-water swim features are detected, the goggles may be turned on for GNSS measurements and position buffering, where the fix rate may be controlled by the user via the smart watch or the smartphone (e.g., using an appropriate UI) or via the goggles. The goggles may store GNSS location data and may, for example, via Bluetooth, upload the GNSS location data to the smart watch or smartphone either when the user is out of water or occasionally when the user's hand is out of water or when the smart watch requests GNSS location data. The smart watch may either automatically delegate the GNSS signal measurement function to the goggles if present, or may delegate based on certain configurable user selections or environment conditions. For example, the smart watch may delegate the GNSS signal measurement function to a goggle when the smart watch is under water or being blocked (e.g., based on the received signal level below a threshold value) while the goggle is out of water or has a better reception of GNSS signals. In some embodiments, the GNSS signal measurement may be switched from the goggle back to the smart watch, for example, when the goggle is in water while the smart watch is out of water, or the goggle may not accept the delegation due to, for example, a low battery condition or a poor GNSS signal reception.

In some implementations, based on certain data measured by the sensors, such as images captured by a camera, at least one of the smart watch, the goggles, or both may be switched on or off, or the smart watch or the goggles may make measurements at a higher or lower rate. For example, the GNSS measurement function of the smart watch or the goggles may be turned on (or turned off) if it is determined based on images captured by the camera that the user in (or out of) a pool or open water. In some cases, based on the condition indicated by the sensor data, such as the surrounding environment of the user, the GNSS measurements may be disabled to save power.

Following completion of a swim, the collected statistics (e.g., track, speed, drift, and currents) for the swim can be displayed on a map via the wearable device 204. The collected statistics can also be transferred to a second electronic device (e.g., a mobile device, a tablet, or a laptop computer) for display. The collected statistics can be transferred to a server for display and access from any networked device, subject to authentication.

Figure 3:
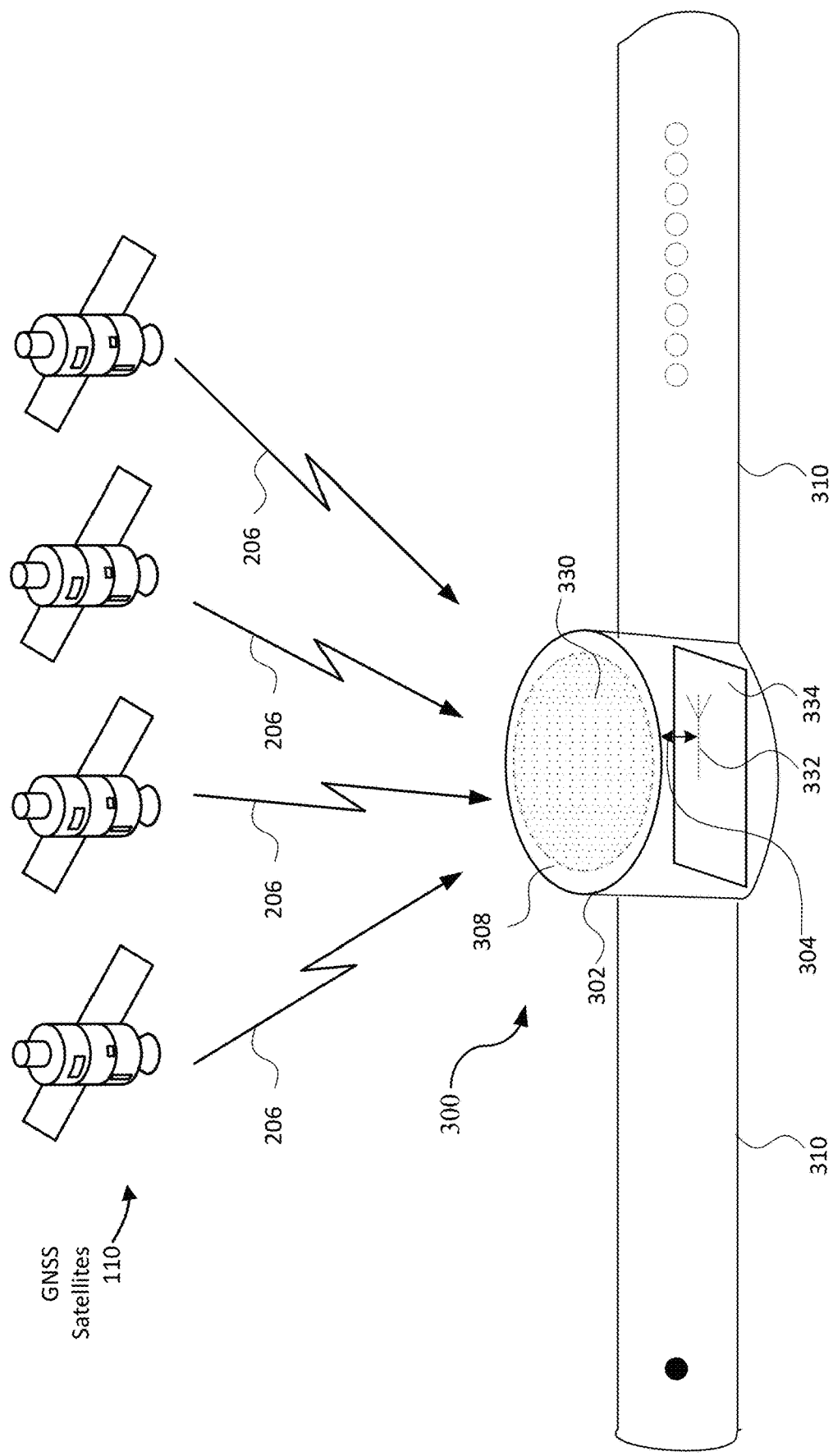
FIG. 3 illustrates an example of a wearable device.

FIG. 3 illustrates an example of a wearable device 300. Wearable device 300 may be an example of wearable device 204. Wearable device 300 can include a case 302, a face 308 (or a window, a display, a screen, or crystal), and a band 310.

FIG. 3 illustrates a plurality of GNSS signals 206 originating from a plurality of GNSS satellites 110. FIG. 3 illustrates a water-to-air interface 330 between the face 308 and a PCB board 334 when wearable device 300 is under water. As shown in FIG. 3, there is a gap 304 (an air or a vacuum gap) between the face 308 and a GNSS antenna 332 on the PCB board 334. The GNSS signals 206 propagate from one medium (e.g., air) to a second medium (water), and may be at least partially reflected at the air-to-water interface. The remaining portion of the GNSS signals 206 may propagate in water and may be further attenuated. The portion of the GNSS signals 206 that reaches the face 308 of the wearable device 300 may be at least partially reflected at the water-to-air interface 330 before entering the gap 304. Thus, the GNSS signals 206 may be greatly attenuated before reaching the GNSS antenna 332 on the PCB board 334. This results in a reduction of the signal-to-noise ratio of the GNSS signals 206 received at the GNSS antenna 332. This reduction in the signal-to-noise ratio of the GNSS signals 206 can result in missed positioning opportunities for the wearable device 300.

Figure 4:
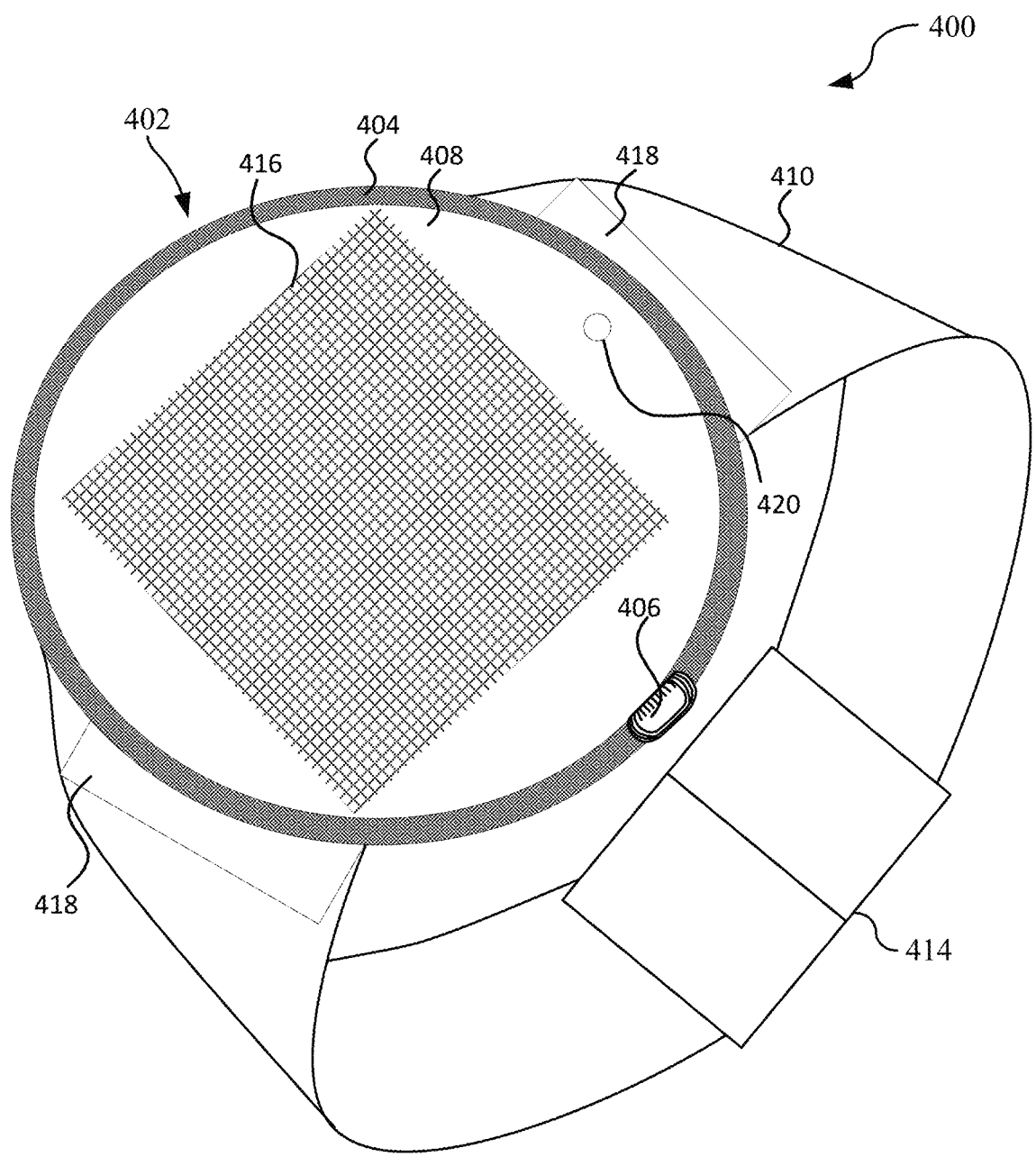
FIG. 4 illustrates an example of a wearable device according to certain embodiments.

FIG. 4 illustrates an example of a wearable device 400. Wearable device 400 may be an example of wearable device 204. The wearable device 400 can include a case 402, a bezel 404, a crown 406, a face 408 (or crystal), bands 410, a camera access port 420, a clasp 414, or any combination thereof.

In various embodiments, a GNSS antenna can be incorporated into an exterior portion of the wearable device 400. In some embodiments, the exterior portion can be the circular bezel 404 of the wearable device 400. In this way, the bezel 404 can function as a circular "patch-like" antenna to receive GNSS signals. The circular antenna can preferentially accept a polarized signal, such as a circularly polarized signal. In various embodiments, the bezel 404 can be electrically connected via a wire (not shown) or other means to a GNSS receiver (not shown) in the case 402 of the wearable device 400. As the bezel 404 is outside the case 402 or housing of the wearable device 400, this location for the GNSS antenna avoids the water-to-air interface between the exterior of the case and an internal GNSS antenna. In various embodiments, the GNSS antenna in the bezel 404 can be connected to a low noise amplifier and then to a connector on the PCB board with the GNSS receiver.

In other embodiments, the exterior portion can be a crown 406 of the wearable device 400. In this way, the crown 406 can function as a circular "patch-like" antenna to receive GNSS signals. The antenna can result in a polarized signal being received. In various embodiments, the crown 406 can be electrically connected via a wire or other means to a GNSS receiver (not shown) in the case 402 of the wearable device 400. As the crown 406 is outside the case 402 or housing of the wearable device 400, this location for the GNSS antenna also avoids the water-to-air interface between the exterior of the case and an internal GNSS antenna. In various embodiments, the GNSS antenna in the crown 406 can be connected to a low noise amplifier and then to a connector on the PCB board with the GNSS receiver.

In other embodiments, the exterior portion can be the face 408 (or a window, cover, or crystal) of the wearable device 400. A mesh, a loop, an inverted F antenna, a directional antenna, or an omnidirectional antenna may be formed on the interior or exterior surface of face 408 or embedded in face 408 to function as an antenna for receiving GNSS signals. For example, a fine and thin mesh antenna 416 can be attached to the interior or exterior surface of face 408 or embedded in face 408 to receive GNSS signals. In various embodiments, the mesh antenna 416 can be electrically connected via a wire or other means to a GNSS receiver (not shown) in the case 402 of the wearable device 400. The mesh antenna 416 can be virtually translucent or transparent so that any display on a dial of wearable device 204 can be viewed through the mesh antenna 416. As the mesh antenna 416 is on an exterior or interior surface of or inside the case 402 or housing of the wearable device 400, this location for the GNSS antenna can also avoid the water-to-air interface between the exterior of the case and an internal GNSS antenna. In various embodiments, the GNSS antenna in the face 408 can be connected to a low noise amplifier and then to a connector on the PCB board with the GNSS receiver. In various embodiments, the mesh antenna 416 can be integrated into a display or screen of the wearable device 400.

In other embodiments, the exterior portion can be portions of one or both bands 410 of the wearable device 400. The bands 410 (or straps) can include one or more GNSS antenna elements 418. The GNSS antenna elements 418 can be embedded in one or both bands 410 (or straps) of the wearable device 400. In various embodiments, there can be a solid connection (e.g., a wire) between the GNSS antenna element 418 and the GNSS receiver in the interior of the case 402 of the wearable device 400. In various embodiments, inductive coupling, capacitive coupling, or another wireless interface can be used between the GNSS receiver and the GNSS antenna element 418, the bezel 404, or the case 402 of the wearable device 400. As the GNSS antenna element 418 is outside the case 402 or housing of the wearable device 400, this location for the GNSS antenna avoids the water-to-air interface between the exterior of the case and an internal GNSS antenna. In various embodiments, the GNSS antenna elements 418 in a band 410 can be connected to a low noise amplifier and then to a connector on the PCB board with the GNSS receiver.

In some embodiments, the exterior portion can be a camera access port 420 or a complication for the wearable device 400. An inverted-F antenna can be installed in the camera access port 420 to receive GNSS signals. In some embodiments, there can be a solid interface between the GNSS antenna and the GNSS receiver in the interior of the case 402 of the wearable device 400. As the GNSS antenna is outside the case 402 or housing of the wearable device 400, this location for the GNSS antenna avoids the water-to-air interface between the exterior of the case and an internal GNSS antenna. In various embodiments, the GNSS antenna in the camera access port 420 can be connected to a low noise amplifier and then to a connector on the PCB board with the GNSS receiver.

Figure 5:
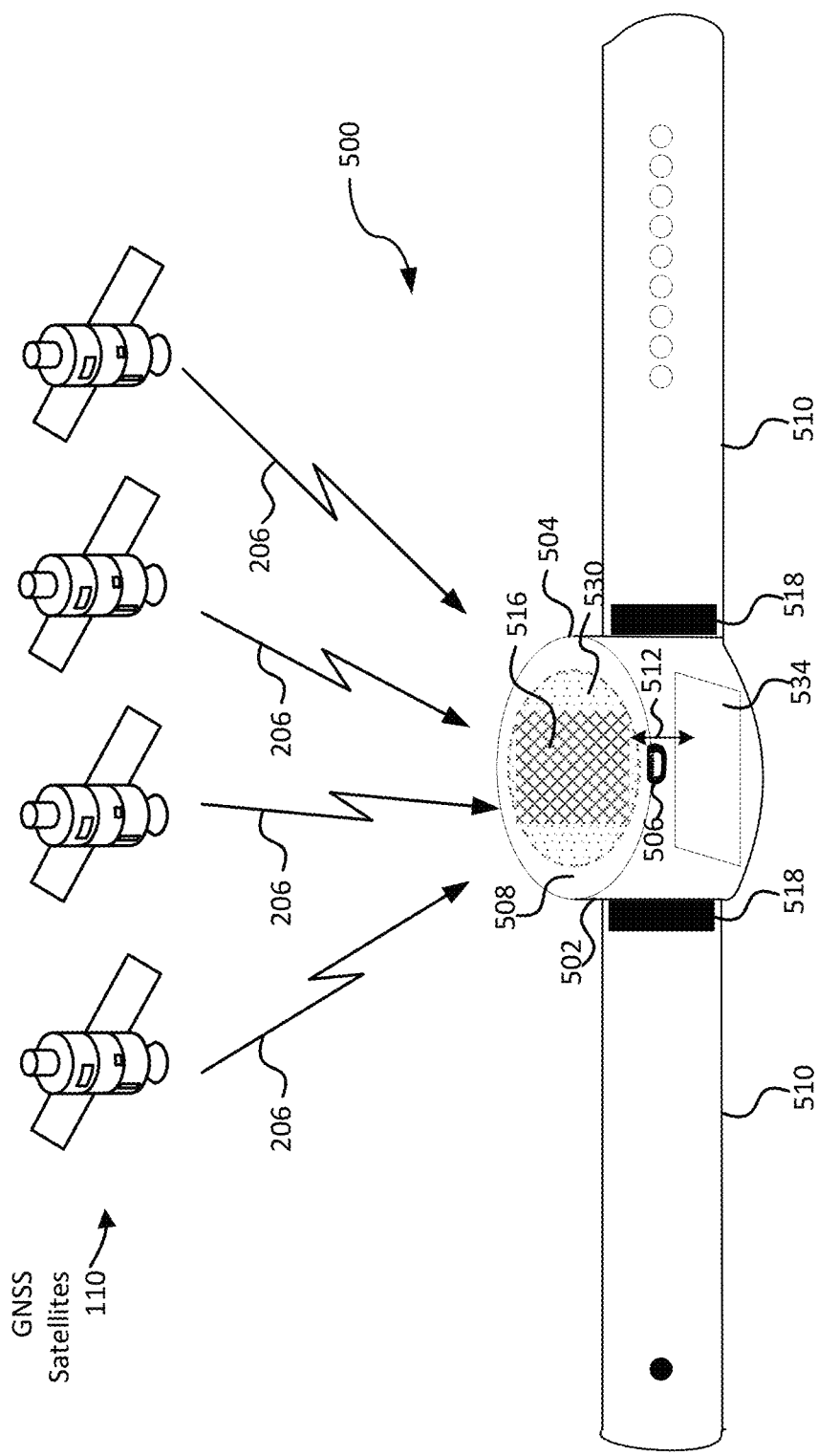
FIG. 5 illustrates another example of a wearable device according to certain embodiments.

FIG. 5 illustrates an example of a wearable device 500. Wearable device 500 may be an example of wearable device 204. The wearable device 500 can include a case 502, a bezel 504, a crown 506, a face 508 (or a display, screen, or crystal), and bands 510.

FIG. 5 illustrates a plurality of GNSS signals 206 originating from a plurality of GNSS satellites 110. As shown in FIG. 5, there is a gap 512 and thus a water-to-air interface 530 between the face 508 and a PCB board 534. In some embodiments, an antenna can be installed on an exterior portion of the wearable device 500 to avoid the water-to-air interface 530.

In some embodiments, the exterior portion can be a circular bezel 504 or a crown 506 of the wearable device 500. In other embodiments, the exterior portion can be one or both bands 510 of the wearable device 500. The bands 510 (or straps) can include a GNSS antenna element 518. The GNSS antenna elements 518 can be embedded in one or both bands 510 (or straps) of the wearable device 500. In various embodiments, there can be a solid interface between the GNSS antenna element 518 and the GNSS receiver in the interior of the case 502 of the wearable device 500. In some embodiments, inductive or capacitive coupling can be used between PCB board 534 and the GNSS antenna element 518, the bezel 504, or the case 502 of the wearable device 500.

In some embodiments, the exterior portion can be the face 508 or crystal of the wearable device 500. A mesh, a loop, an inverted F antenna, a directional antenna, or an omnidirectional antenna may be formed on the interior or exterior surface of face 508 or embedded in face 508 to function as an antenna for receiving GNSS signals. For example, a mesh antenna 516 can be attached to the interior or exterior surface of face 508 or embedded in face 508 to receive GNSS signals. In some embodiments, the mesh antenna 516 can be electrically connected via a wire or other means to a GNSS receiver (not shown) on PCB board 534 in the case 502 of the wearable device 500. The mesh antenna 516 can be virtually translucent or transparent so that a display can be viewed through the mesh antenna 516.

Figure 6:
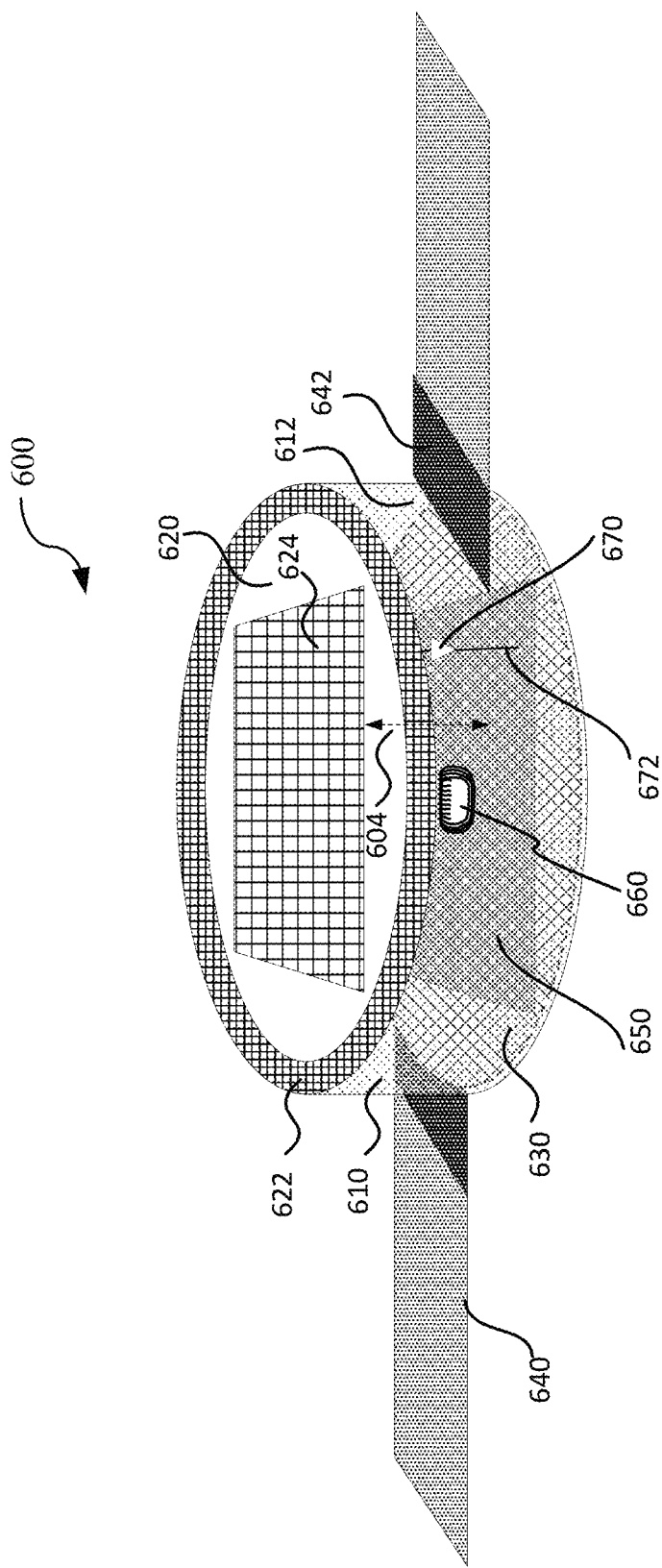
FIG. 6 illustrates an example of a wearable device according to certain embodiments.

FIG. 6 illustrates an example of a wearable device 600 according to certain embodiments. Wearable device 600 may include a case 610, a top cover 620, a bottom cover 630, a band 640, a PCB board 650 in case 610, and a crown 660. Case 610 may include at least a layer 612 that includes a non-conductive material, such as a plastic, a ceramic, or another dielectric material. Top cover 620 and bottom cover 630 may be parts of case 610 or may be coupled to case 610 to form a hermetically sealed case or housing. Top cover 620 may include, for example, a display, a screen, or a glass window. A bezel 622 may be at the circumference of top cover 620. Bottom cover 630 may include a conductive plate that may be in contact with a user's skin when in use. In some embodiments, wearable device 600 may include a structure different from band 640 to attach wearable device 600 to a user or the apparel a user wears. For example, the structure may be a hook, a clip, a fastener, and the like. PCB board 650 may include various electrical components and circuits installed thereon, such as signal conditioning circuits, various sensors, data processing units, communication subsystems, input/output device (e.g., display) drivers, memory, and the like, as described in more detail below with respect to FIG. 15. For example, wearable device 600 may include a pressure sensor that can determine the depth of wearable device 600 under water. The electrical components and circuits on PCB board 650 may be used to perform various methods described below. PCB board 650 may be at a distance 604 (e.g., by an air or vacuum gap, or a dielectric filling material) from top cover 620. Wearable device 600 may also include one or more antennas, such as a GNSS antenna, a WAN or Wi-Fi antenna, a near-field communication (NFC) antenna, a Bluetooth (e.g., BLE) antenna, and the like.

In various embodiments, one or more GNSS antennas may be located at one or more exterior portions of the body of the wearable device 600 for receiving GNSS signals at the exterior portions of the body of wearable device 600, rather than at PCB board 650 or other portions of wearable device 600 inside case 610. For example, in some embodiments, bezel 622 may include a metal ring that can, in combination with layer 612 and bottom cover 630, form a ring-shaped GNSS antenna to receive GNSS signals. Bottom cover 630 may be a ground plane for the GNSS antenna, where a user (e.g., in water) may function as a ground or provide a path to ground (or water). Layer 612 may be the dielectric layer between the ground and the meta ring. The ring-shaped GNSS antenna may preferentially accept polarized signals, such as a circularly polarized GNSS signal. In some embodiments, the metal ring of bezel 622 may be electrically connected via a connector 672 (e.g., a metal wire or a conducting via) or other means (e.g., through capacitive or inducting coupling) to a GNSS receiver on PCB board 650. In some embodiments, the metal ring in bezel 622 may be connected to a low noise amplifier (LNA) 670 and/or a filter first for signal conditioning and amplification, and the output of LNA 670 may be connected to the GNSS receiver on PCB board 650 through connector 672. Because bezel 622 is outside of case 610 of the body of wearable device 600, the GNSS signals can be received by the ring-shaped GNSS antenna outside of case 610. As such, the GNSS signals would not need to propagate into case 610 through the gap or filling material to reach PCB board 650. Therefore, the water-to-air interface between the exterior of case 610 and an internal GNSS antenna as shown in FIG. 3 (e.g., water-to-air interface 330) may be avoided by the GNSS signals. In addition, bezel 622 may at least periodically face the sky when the user in water (e.g., when the user is swimming in open water) makes a stroke. Therefore, the ring-shaped GNSS antenna formed by the metal ring in bezel 622 may more efficiently receive the GNSS signals.

In some embodiments, the exterior portion may be top cover 620 (e.g., a glass or plastic window, a screen, or a display) of wearable device 600. A mesh, a loop, an inverted F antenna, a directional antenna, or an omnidirectional antenna may be formed on the interior or exterior surface of top cover 620 or embedded in top cover 620 to function as an antenna for receiving GNSS signals. For example, a fine and thin metal mesh 624 may be formed on the top (exterior) or bottom (interior) surface of top cover 620 or may be embedded in top cover 620. Metal mesh 624 may be translucent or transparent to visible light such that a dial or a display panel of wearable device 600 can be viewed through metal mesh 624. Metal mesh 624 may, in combination with layer 612 and bottom cover 630, form a mesh GNSS antenna. Bottom cover 630 may be a ground plane for the mesh GNSS antenna, where a user (e.g., in water) may function as a ground or provide a path to ground (or water). Layer 612 may be the dielectric layer between the ground and metal mesh 624. In some embodiments, metal mesh 624 may be electrically connected via a connector 672 (e.g., a metal wire or a conducting via) or other means (e.g., through capacitive or inducting coupling) to a GNSS receiver on PCB board 650. In some embodiments, metal mesh 624 may be connected to a low noise amplifier 670 and/or a filter first for signal conditioning and amplification, and the output of LNA 670 may be connected to the GNSS receiver on PCB board 650 through connector 672. Because metal mesh 624 is on top cover 620 of wearable device 600, the GNSS signals can be received by the mesh GNSS antenna outside of case 610. As such, the GNSS signals would not need to propagate into case 610 through the gap or filling material to reach PCB board 650. Therefore, the water-to-air interface between the exterior of case 610 and an internal GNSS antenna as shown in FIG. 3 (e.g., water-to-air interface 330) may be avoided. In addition, metal mesh 624 may at least periodically face the sky when the user in water (e.g., when the user is swimming in open water) makes a stroke. Therefore, the mesh GNSS antenna formed by metal mesh 624 may more efficiently receive the GNSS signals.

In some embodiments, the exterior portion may be crown 660 of wearable device 600. Crown 660 may, in combination with layer 612 and bottom cover 630, form a "patch-like" GNSS antenna to receive GNSS signals as described above. In some embodiments, crown 660 may be connected to a low noise amplifier 670 and/or a filter first for signal conditioning and amplification, and the output of LNA 670 may be connected to the GNSS receiver on PCB board 650 through connector 672. Because crown 660 is outside of wearable device 600, the GNSS signals can be received by the GNSS antenna outside of case 610. As such, the GNSS signals would not need to propagate into case 610 through the gap or filling material to reach PCB board 650. Therefore, the water-to-air interface between the exterior of case 610 and an internal GNSS antenna shown in FIG. 3 (e.g., water-to-air interface 330) may be avoided by the GNSS signals. In addition, crown 660 may at least periodically face the sky when the user in water (e.g., when the user is swimming in open water) makes a stroke. Therefore, the GNSS antenna formed by crown 660 may more efficiently receive the GNSS signals.

In some embodiments, case 610 may not be hermetically sealed, but PCB board 650 may be hermetically sealed. Thus, water may be allowed to enter case 610 and fill the gap in case 610 to eliminate any air interface in case 610 and signal loss at the air interface. PCB board 650 may be hermetically sealed to prevent water from reaching PCB board 650. The GNSS antenna may be on PCB board 650 or may be in a dielectric material layer that encapsulates or covers PCB board 650.

In some embodiments, the exterior portion may be portions of band 640 of wearable device 600. Band 640 may include one or more GNSS antenna elements 642. For example, GNSS antenna elements 642 can be embedded in band 640 of wearable device 600. In some embodiments, GNSS antenna element(s) 642 may be connected to a low noise amplifier 670 and/or a filter first for signal conditioning and amplification, and the output of LNA 670 may be connected to the GNSS receiver on PCB board 650 through connector 672. Because GNSS antenna elements 642 is outside of wearable device 600, the GNSS signals can be received by the GNSS antenna outside of case 610. As such, the GNSS signals would not need to propagate into case 610 through the gap or filling material to reach PCB board 650. Therefore, the water-to-air interface between the exterior of case 610 and an internal GNSS antenna shown in FIG. 3 (e.g., water-to-air interface 330) may be avoided by the GNSs signals. In addition, GNSS antenna element(s) 642 may be close to case 610 and thus may at least periodically face the sky when a user in water (e.g., when the user is swimming in open water) makes a stroke. Therefore, the GNSS antenna formed by crown 660 may more efficiently receive the GNSS signals.

In some embodiments, any combination of these GNSS antennas described above may be used to receive the GNSS signals. In some embodiments, the GNSS antenna may include an array of antenna elements. In some embodiments, the GNSS antenna may also be used as, for example, a WAN or Wi-Fi antenna. For example, a filter or a splitter may be used to separate GNSS signals and WAN or Wi-Fi signals. In some embodiments, a switch may be used to connect the antenna to the GNSS receiver circuit on PCB board 650 or to a WAN or Wi-Fi receiver circuit on PCB board 650. For example, the pressure sensor described above may be used to determine whether wearable device 600 is in water such that the antenna may be switched to the GNSS receiver circuit when wearable device 600 is determined to be out of water or to the WAN or Wi-Fi receiver circuit when wearable device 600 is determined to be in water.

Figure 7:
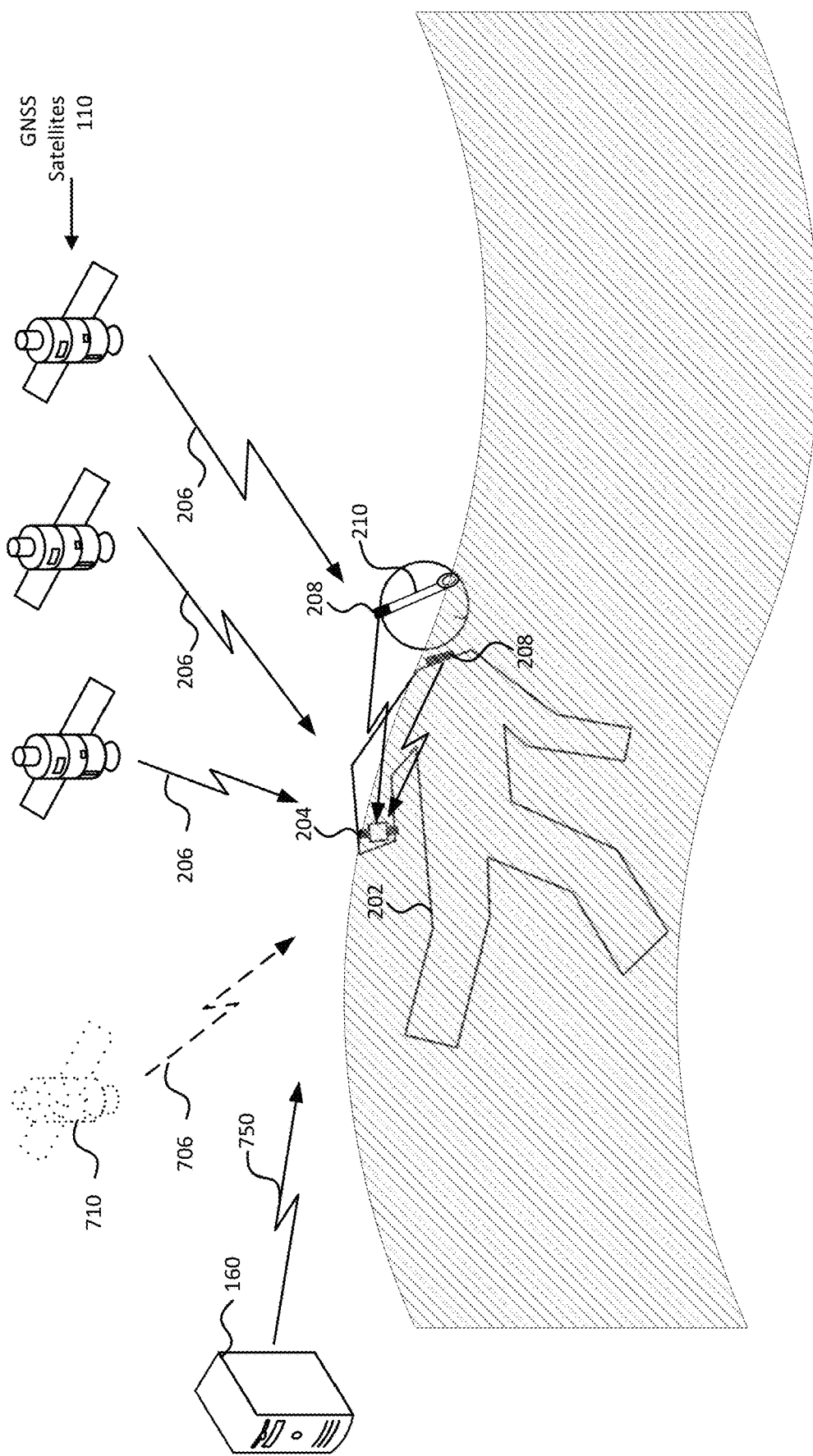
FIG. 7 illustrates a technique for projecting satellite position for increasing positioning accuracy.

FIG. 7 illustrates a technique for projecting satellite position for increasing positioning accuracy. In various embodiments, a second electronic device 208 can be removably coupled to a portion of a user's equipment or clothing that remains outside of the water to improve GNSS signal 206 reception. For example, the second electronic device 208 can be coupled to the back of a user's goggles 210, a mask (not shown), a snorkel (not shown), a headband (not shown), or a swim cap (not shown).

The conventional approach to using GNSS satellites to determine a receiver's position generally requires the receiver to download navigation messages from three or more visible satellites, extract the broadcast ephemerides for each satellite from the navigation messages, and utilize the ephemeris data to compute the position of the satellites in the ECEF (earth-centered earth-fixed) coordinate system at a specific time. The broadcast ephemerides for each satellite are provided in a frame of data that takes about 30 seconds to send/receive. The broadcast ephemerides are valid for a period of four hours starting from the time the satellite starts to broadcast the navigation data. A control station uploads the data to the satellite less frequently, usually a couple of times a day. After a four-hour period, the receiver may need to again download the latest broadcast ephemerides.

Under "warm" or "cold" start conditions, the GNSS receiver may not have valid ephemerides, and so it may have to wait until at least four satellites have been acquired and their broadcast ephemerides extracted before estimating a position. This extends the time needed to acquire valid ephemerides to beyond 30 seconds, perhaps to several minutes, which may not be acceptable to a user.

Furthermore, under weak signal conditions, the signal-to-noise ratio of the signal from one or more satellites may fall below the receiver's threshold to decode the navigation message without substantial errors. These conditions can exist when a wearable device containing the GNSS receiver are partially submerged under water. If less than four available satellites are visible, satellite pseudo range data can be propagated forward for satellites in a position to give the best possible dilution of position (DOP) based on known ephemeris data. For example, as shown in FIG. 7, the visible GNSS satellites 110 can result in less than optimum geographic solution for the wearable device 204, in part because they can tend to skew the location towards the grouping without the fourth satellite. One technique to compensate for these effects is to use the ephemeris data for the fourth satellite 710 because the fourth satellite's GNSS signal 706 is not received by the wearable device 204. The technique can include propagating the fourth satellites' signal based on prior observations, known times, and ephemeris information. For example, in the case of bad Doppler information, adding the fourth satellite can pull the location back into an accurate position.

To overcome these types of issues, the GNSS receiver can obtain ephemerides from, for example, a cellular network if the receiver has the capability to communicate with a wireless network via assisted GNSS (A-GNSS). Alternately, the ephemerides can be in the form of a file that is stored in memory at the receiver. This file may include ephemeris data for one or more satellites that is valid for several days. The file can be transmitted to the GNSS receiver using a wireless medium, or a user can periodically connect the GNSS receiver to the Internet and download the latest file from a known location. With assistance from the wireless network or from a stored file, the time to first fix (TTFF) can be reduced to a few seconds (on the order of 5-15 seconds).

However, the size of the file can be problematic. If the file is large, it can take a long time to transfer the file to a GNSS receiver and the wearable device can have limited memory resources. There are usually costs associated with the file transfer. For example, the file may have to be transferred to the GNSS device over a wireless link, or a user may have to connect the device to a computer that is linked to the server where the file exists in order to transfer download the file. The cost of transferring the file is usually proportional to the transmit time or the size of the file being transmitted. Also, the user may be inconvenienced by the amount of time it takes to download the file. Furthermore, if the GNSS receiver is part of a wearable device or the like with limited memory capacity, then a large file may consume an inordinate share of device memory.

According to an embodiment of the invention, a receiving (e.g., client) device can access a file containing scaled values (e.g., integer values) and scaling factors. The scaling factors are used to convert the scaled values into coefficients and residuals, which in turn can be used with time-dependent functions to calculate ephemeris data, including clock correction data, for satellite navigation system (e.g., GNSS) satellites. The client device can use the calculated ephemeris data and clock corrections to determine a position (e.g., the location of the device). The ephemeris data can be used to predict a location from the fourth satellite 710 even though the predicted GNSS signal 706 is not received by the wearable device 204.

By representing the ephemeris data, including clock correction data, using scaled values and scaling factors, the size of the file can be significantly reduced, in turn reducing the amount of time needed to transmit and/or download the file to the client device and also reducing the amount of device memory consumed by the file. According to embodiments of the invention, a week's worth of ephemeris data and clock correction data can be stored using less than about 15 kilobytes (KB) of file space. A file of this size is better by a factor of three to four in comparison to the case in which ephemeris data sets estimated from, for example, Jet Propulsion Laboratory data are accumulated every four hours and sent uncompressed.

The system can include a constellation of satellites 110, a wearable device 204 that includes a memory and a central processing unit (CPU) and may also include a wireless receiver, and a location server 160, which also has memory and a CPU and may include a wireless transmitter.

The location server 160 can send ephemeris information 750 to a wearable device 204 via a wired or wireless connection, either directly or indirectly (e.g., via an intermediate or companion device of some sort). Ephemeris information 750 may include, for example, long term ephemeris data, broadcast ephemeris, long term almanac data, broadcast ephemeris, ephemeris/almanac corrections, or a combination thereof. Alternatively, information may be transferred from the location server 160 to the wearable device 204 using some type of portable computer-readable storage medium such as those mentioned above. The wearable device 204 generally has access to information residing on the location server 160.

In one embodiment, the wearable device 204 has the capability to receive and process satellite navigation system signals from the satellites 110. The satellite navigation system signals include ephemeris data and clock correction data. The satellite navigation system signals generally include information that allows the wearable device 204 to determine its location.

According to embodiments of the invention, the location server 160 receives raw data (source data) in the form of periodic satellite positions (ECEF x-y-z coordinates) and clock corrections for several days into the future from a source such as, but not limited to, the Jet Propulsion Laboratory (JPL). Orbital determination, prediction and propagation for satellites can be forecast with high accuracy. The source data may also include quality indicators for both the predicted satellite positions and clock corrections.

According to some embodiments described herein, predicted ephemeris data and clock corrections, which may be collectively referred to herein as pseudo-ephemeris or synthetic ephemeris data, is derived at the location server 160 from the source data. The pseudo-ephemeris data can be made available to the wearable device 204 in a compressed format within a binary file. The predictions are typically available for a period of several days. The predicted clock corrections can be updated using broadcast ephemerides, if available, that are received during the period covered by the prediction. By estimating ephemerides from the source data and compressing the result, the ephemerides (including clock corrections) are formatted in a manner that facilitates transmission, storage and retrieval.

In the discussion to follow, the term "predicted" is used to refer to data that is derived from raw source data in the form of satellite positions and clock corrections. The predicted data is compressed, as will be described, and the term "calculated" is used to refer to data that is calculated (reconstructed) from the compressed data. The term "broadcast" is used to refer to data that is broadcast from a satellite. In a sense, predicted data is used to forecast broadcast data, and calculated data (which is based on predicted data) is used in lieu of broadcast data.

Ephemeris parameters can be estimated from raw (source) data that is in the form of periodic satellite positions (ECEF x-y-z coordinates) and clock corrections for several days into the future. In other words, instead of converting a set of ephemeris parameters to satellite positions in ECEF coordinates, the reverse operation of going from known satellite positions to a set of ephemeris parameters is performed.

The source data is not necessarily continuous; for example, the sequence of satellite positions and clock corrections may be provided at 15-minute intervals. The result of this process is a set of time-dependent and satellite-dependent ephemeris parameters and clock corrections. If the source data is spaced at 15-minute intervals, then at this point the predicted ephemeris parameters and clock correction data are also spaced at 15-minute intervals.

The time-dependent values of each ephemeris parameter (excluding clock corrections, which are discussed below) can be independently represented as a continuous function of time and other orbital parameters. For example, a polynomial or trigonometric function can be fit to the data generated in this process, with each parameter represented by a separate function or model. There may be differences between the values used to derive the function (the predicted values from this process) and the values calculated when the function is subsequently evaluated. These differences, or residuals, can also be calculated for various time intervals. To reduce the amount of data in the binary file, the residuals can be determined as follows: if, for example, the predicted ephemeris parameters are determined at 15-minute intervals, then the residuals can also be determined at 15-minute intervals, but then a mean of the residuals for a period of four to six hours can be calculated and included in the binary file.

The clock corrections also vary with time, and in a similar manner the variation of the clock corrections can be represented as a sum of polynomial and harmonic curves. The clock correction term in the source (e.g., JPL) data can be curve-fit, and the coefficients of the curve can be represented using scaled values and scaling factors. The polynomial coefficients given in subframe one (e.g., af0, af1 and af2) terms that correspond to the phase error, frequency error, and rate of change of frequency error, respectively, can be derived from the clock correction model when the ephemeris and clock corrections are reconstructed at the receiver.

The coefficients and constants associated with the functions derived in this process can each represented as the product of a scaling factor and a scaled value such as a signed integer value. For example, a predicted ephemeris parameter may be represented as a time-dependent third-order polynomial with three coefficients and a constant, each of which can be represented as the product of a scaling factor and an integer. The coefficients for curve fit to the clock correction term can also be expressed as multiples of a scaling factor and a scaled value.

The scaling factors and signed scaled values can be converted to the binary number system and written into a file that has a specific format known to the satellite navigation system receiver (e.g., the wearable device 204). Such a file can be about 15 KB in size or may be as small as several KBs.

The file can be provided to the receiver in several ways. In one implementation, the wearable device 204 connects to a networked computer (e.g., the location server 160) using a known interface (such as a universal serial bus interface) and downloads the most recent binary file prior to a swimming activity. In another implementation, the wearable device 204 utilizes a wireless interface or a cellular network to connect wirelessly to the location server 160 (or to another device that has received the file from the server) in order to download the file. In other embodiments, a companion device, e.g., a mobile phone, may download the file and transfer to the wearable device 204 through wired or wireless means.

This process can then be repeated for the next prediction period. Note that new and more recent binary files can be generated more frequently than the frequency at which the wearable device accesses a binary file. That is, for example, the wearable device 204 may download a new binary file on a weekly basis; however, a new file may be created every four hours (e.g., JPL provides a new seven-day prediction every four hours) or, in general, as frequently as the source data is updated.

Depending on the time it takes to download the source data and generate the binary file, it is possible for the source data to become outdated at the time the binary file is ready. Thus, the location server 160 could verify the source data just before issuing a newly generated binary file. Furthermore, sometime may pass between the time the file is generated and the time at which the wearable device 204 downloads the file or uses the information in the downloaded file. During that period, an event may occur that has a significant impact on the manner in which the data in the file should be used. For example, for some reason, the source data for one of the satellites relied upon to generate the data in the file may no longer be satisfactory. Accordingly, the file can be modified to remove data associated with that satellite, or the wearable device 204 can be instructed to ignore data associated with that satellite.

At the receiver (wearable device) side, the reverse of the above is essentially implemented in order to reconstruct coefficients, constants and residuals, which can in turn be used to reconstruct the predicted ephemerides and the clock correction terms (e.g., af0, af1 and af2). The type of function (e.g., third-order polynomial) that was used by the location server 160 to represent the predicted ephemerides and clock corrections is known to the wearable device 204. The wearable device 204 selects the appropriate coefficients, constants and residuals and uses those values with the proper function to calculate the parameter of interest (ephemeris or clock corrections), until all needed values are calculated. The calculated values can then be used by the wearable device 204 to determine its location in a conventional manner.

The binary data can be extracted from the file in different ways, depending on factors such as the amount of available memory, program space, and processing power. In a device with limited available memory and buffer space, such as a mobile device, the ephemerides and clock corrections can be calculated as needed (e.g., for specific satellites at a given epoch) without having to extract all the data in the binary file at once, thus reducing the requirements placed on the client device. Alternatively, all of the ephemerides and clock corrections represented in the file can be calculated, or some subset (e.g., a sliding window) of values can be calculated.

The calculated clock correction terms for a particular satellite can be adjusted at the wearable device 204 using broadcast ephemerides (specifically, broadcast clock correction terms) from that satellite, if such broadcast information is available. In other words, if the wearable device 204 can gain access to more recent clock correction data, then the client device can use that information to correct the clock correction terms.

The predicted ephemeris data for a plurality of satellites is derived from source data that describes predicted positions of the satellites at selected times. Each satellite orbit can be modeled as a modified elliptical orbit where the ideal two-body Kepler orbit is perturbed by several factors not limited to non-spherical earth gravitational harmonics, solar radiation pressure, lunar, and solar gravitation.

Figure 8:
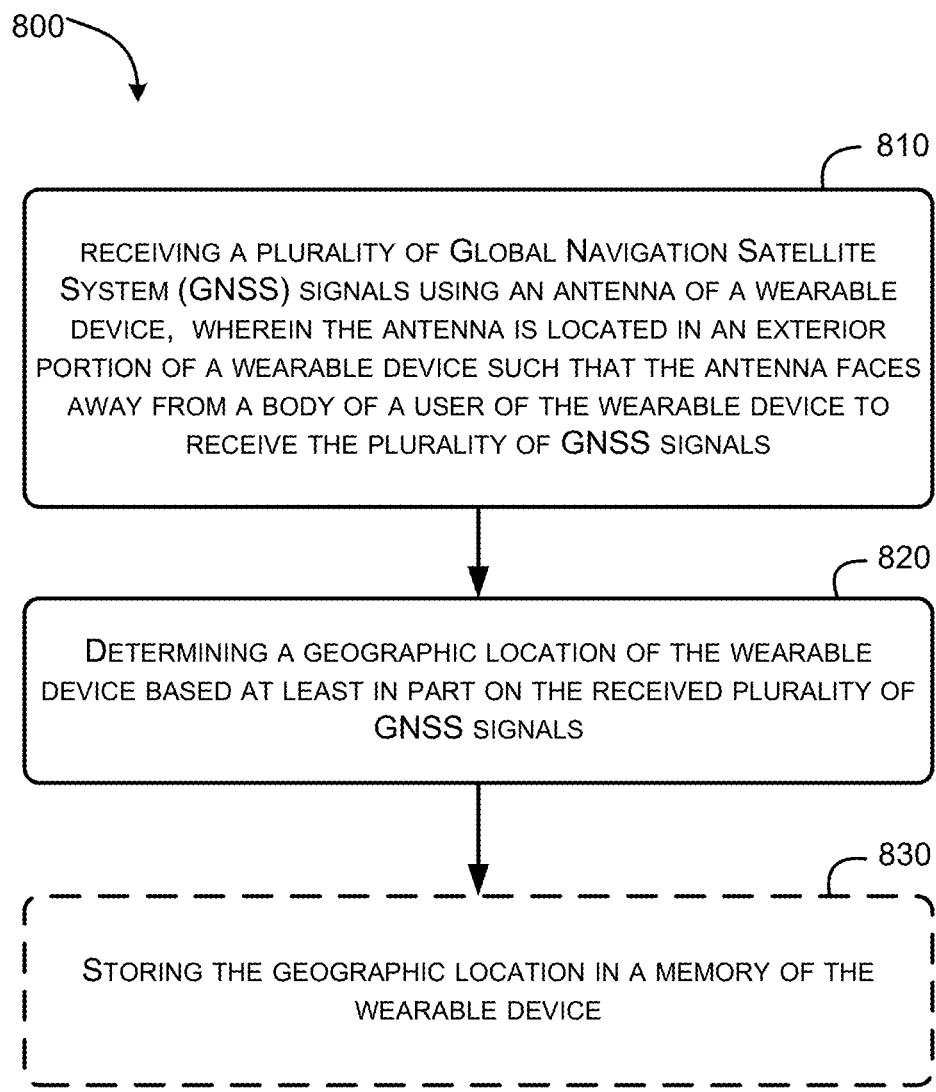
FIG. 8 illustrates an exemplary flow chart of a process for improving reception of GNSS signals during water immersion activities.

FIG. 8 illustrates an exemplary flow chart of a process 800 for improving reception of GNSS signals during water immersion activities. In some implementations, one or more process blocks of FIG. 8 can be performed by a wearable device described herein, such as wearable device 204, 400, 500, or 600 described above. In some implementations, one or more process blocks of FIG. 8 can be performed by another device or a group of devices separate from or including the wearable device.

Figure 15:
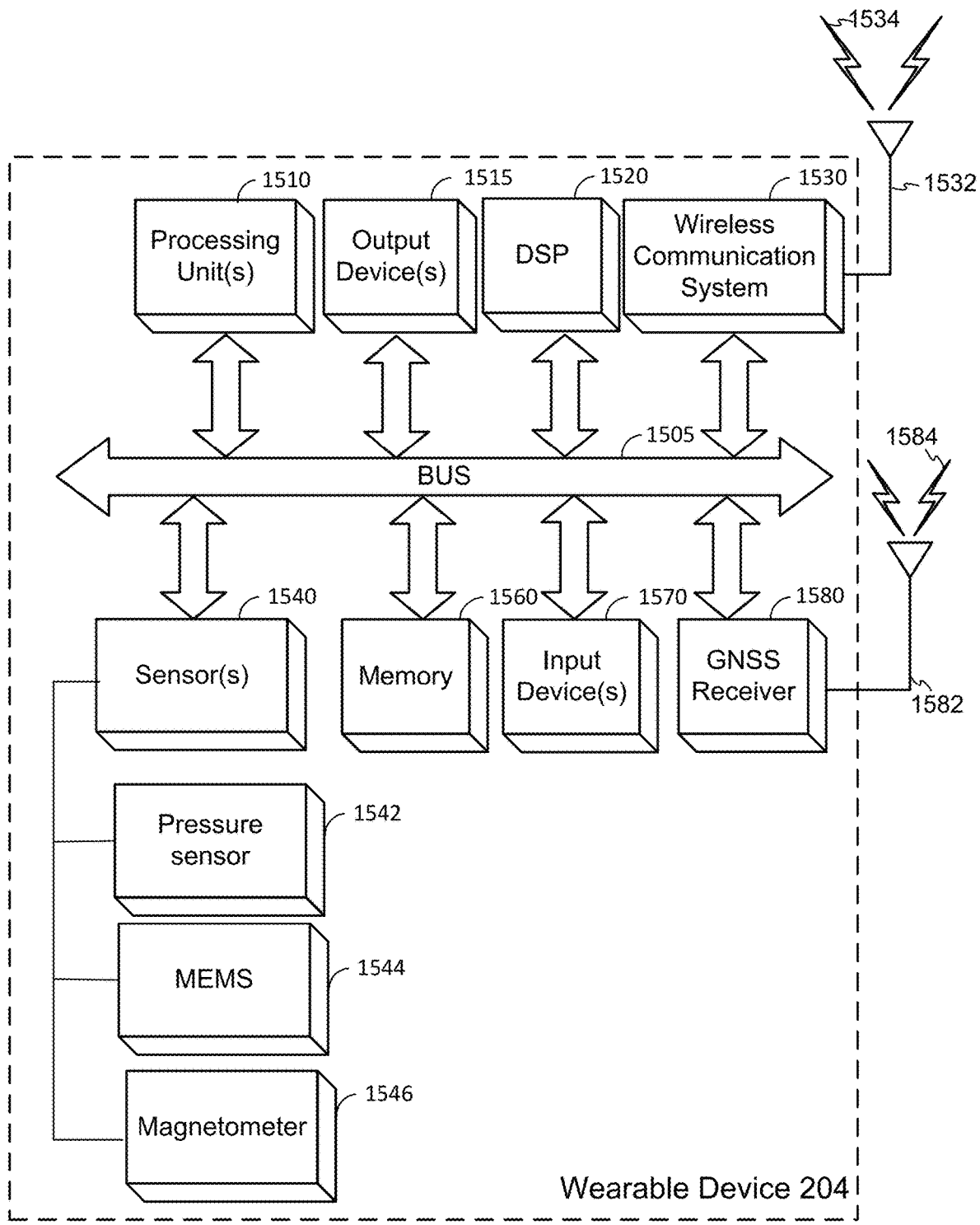
FIG. 15 illustrated a block diagram for an exemplary embodiment of a wearable device.

At 810, process 800 can include receiving a plurality of GNSS signals using an antenna, where the antenna is located in an exterior portion of a wearable device (e.g., a smart watch) such that the antenna receives the plurality of GNSS signals without the plurality of GNSS signals first passing through an air gap within a case or housing of the wearable device. For example, the wearable device (e.g., using processing unit(s) 1510, memory 1560, GNSS receiver 1580, GNSS antenna 1582, and/or the like as illustrated in FIG. 15 and described below) can receive a plurality of GNSS signals 206 using an antenna, as described above. In some implementations, the antenna is in an exterior portion of a wearable device such that the antenna detects the plurality of GNSS signals without the plurality of GNSS signals first passing through an air gap within the case or housing of the wearable device. In some implementations, the exterior portion of the wearable device can include a bezel of the wearable device. In some implementations, the exterior portion of the wearable device can include a crown of the wearable device. In some implementations, the exterior portion of the wearable device can include a portion of a band of the wearable device adjacent a face of the wearable device. In some implementations, the exterior portion can include a face of the wearable device and the antenna comprises a mesh antenna.

By positioning the GNSS antenna outside the device, the water-to-air boundary can be avoided which may allow for reception of GNSS signals at a depth. It may only be a few centimeters, but this may be sufficient for reception of GNSS signals under some swimming strokes (e.g., sidestroke, or breaststroke). When a user's arm comes straight out in front of the torso, it may be close enough to the surface for receiving GNSS signals.

At 820, process 800 can include calculating a geographic location of the wearable device based at least in part on the plurality of GNSS signals. Each of the GNSS satellites emits signals to receivers that determine their locations by computing the difference between the time that a signal is sent and the time it is received. GNSS satellites carry atomic clocks that provide extremely accurate time. The time information is placed in the codes broadcast by the satellite so that a receiver can continuously determine the time the signal was broadcast. The signal contains data that a receiver uses to compute the locations of the satellites and to make other adjustments needed for accurate positioning. The GNSS receiver uses the time difference between the time of signal reception and the broadcast time to compute the distance, or range, from the receiver to the satellite. The receiver must account for propagation delays or decreases in the signal's speed caused by the ionosphere, the troposphere, and the water. With information about the ranges to three or more satellites and the location of the satellite when the signal was sent, the receiver can compute its own three-dimensional position. An atomic clock synchronized to GNSS is used in order to compute ranges from these satellites. However, by taking a measurement from a fourth satellite, the receiver avoids the need for an atomic clock. Thus, the receiver uses four satellites to compute latitude, longitude, altitude, and time. For example, the wearable device (e.g., using processing unit(s) 1510, memory 1560, GNSS receiver 1580, GNSS antenna 1582, and/or the like as illustrated in FIG. 15 and described below) can calculate a geographic location of the wearable device based at least in part on the plurality of GNSS signals, as described above.

At 830, process 800 can include storing the geographic location in a memory of the wearable device. For example, the wearable device (e.g., using processing unit(s) 1510, memory 1560, GNSS receiver 1580, GNSS antenna 1582, output device 1515 and/or the like as illustrated in FIG. 15 and described below) can store one or more geographic locations and associated times in a memory of the wearable device, as described above. The memory can be, for example, a flash memory installed inside the wireless device. The one or more geographic locations and associated times can be transmitted from the wearable device to one or more electronic devices or a cloud storage via a wired or wireless protocol.

Process 800 can include additional implementations, such as any single implementation or any combination of implementations described below and/or in connection with one or more other processes described elsewhere herein. It should be appreciated that the specific steps illustrated in FIG. 8 provide particular techniques for improving reception or compensating for attenuation of GNSS signals during water immersion activities according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 8 can include multiple sub-steps that can be performed in various sequences as appropriate to the individual step. Furthermore, additional steps can be added or removed depending on the particular applications. One of ordinary skill in the art would recognize many variations, modifications, and alternatives.

In some implementations, process 800 includes accessing information regarding a plurality of stored geographic points stored in the memory of the wearable device. The stored geographic points can define a geographic zone, such as a swim lane. The process 800 can include determining whether the geographic location of the wearable device is outside the defined swim lane. The process 800 can include providing feedback to a user indicating the geographic location of the wearable device is outside the swim lane.

In various embodiments, buoys or boats on an open watercourse can have beacons that transmit wireless signals that can be received by the wearable device and be used in defining the swim lanes. The buoys or boats can include devices to perform differential processing on received GNSS signals or perform one or more ranging techniques with the wearable devices. If there are multiple buoys or boats or some combination thereof, trilateration techniques can be used to determine an accurate position of the wearable device.

Other terrestrial transmitters in water or out of water, such as nearby access points, 5G TRPs, beacons, and UWB reference points (e.g., on a device fixed on shore or on a buoy), may also transmit wireless signals that can be received by the wearable device for positioning.

In some implementations, the feedback comprises haptic feedback. For example, the feedback can include vibrating the housing of the wearable device. In some embodiments, the vibrating can be performed in an identifiable pattern. In some implementations, the feedback comprises audio feedback. The audio feedback can include sound (e.g., an aural tone or beeping) from a speaker on the wearable device. In some embodiments, the feedback can be a message sent wirelessly as via a wireless protocol. The message can be received by another device, such as a smart mask or smart goggles which can receive the message and display the information via a display of the smart mask or smart googles. In some embodiments, the feedback can be visual feedback, such as the flashing of a light source.

In some implementations, process 800 includes storing a plurality of geographic locations and associated times in the memory of the wearable device. The process 800 can include calculating one or more characteristics of the water immersion activities based at least in part on the plurality of geographic locations and the associated times. For example, the characteristics can include automatically calculated speed, distance, route, tracking calories, and overall pace.

In some implementations, process 800 can include sending, via a wireless link, the geographic location of the wearable device to another electronic device. For example, the information can be transmitted via a wireless protocol (e.g., Bluetooth) to a mobile device.

In some implementations, the wearable device comprises a casing or another structure configured to be removably coupled to user equipment or clothing. In some embodiments, the casing can be coupled to one of swim googles, a swim mask, or a snorkel. In some embodiments, the casing can be coupled to clothing including one or more of a wet suit, a rash guard, and/or a swim shirt.

Although FIG. 8 shows example steps of process 800, in some implementations, process 800 can include additional steps, fewer steps, different steps, or differently arranged steps than those depicted in FIG. 8. Additionally, or alternatively, two or more of the steps of process 800 can be performed in parallel.

In one aspect, a wearable device can include a communication interface, a memory, and one or more processing units communicatively coupled with the communication interface and memory and configured to cause the wearable device to perform the methods described above.

In another aspect, a non-transitory computer-readable medium can include a plurality of instructions stored thereon, where the plurality of instructions when executed on a processor cause the processor to perform the methods described above.

Figure 9:
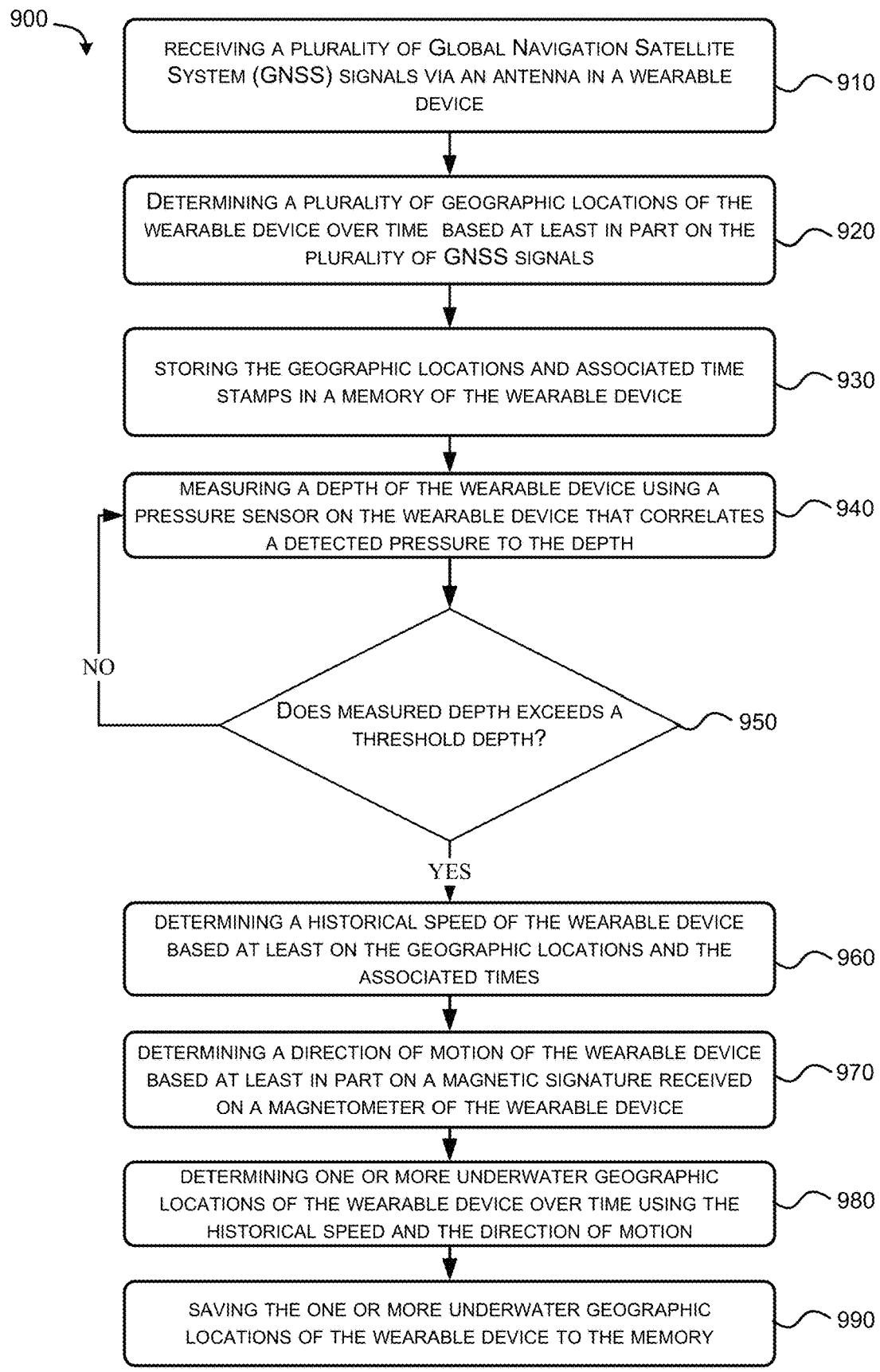
FIG. 9 illustrates an exemplary flow chart of a process for compensating for attenuation of GNSS signals during water immersion activities.

FIG. 9 is a flow chart of an example process 900 for compensating for attenuation of GNSS signals during water immersion activities. In some implementations, one or more process blocks of FIG. 9 can be performed by a wearable device described herein, such as wearable device 204, 400, 500, or 600. In some implementations, one or more process blocks of FIG. 9 can be performed by another device or a group of devices separate from or including the wearable device.

At 910, process 900 can include receiving a plurality of GNSS signals via an antenna in a wearable device. For example, the wearable device (e.g., using processing unit(s) 1510, memory 1560, GNSS receiver 1580, GNSS antenna 1582, and/or the like as illustrated in FIG. 15 and described below) can receive a plurality of GNSS signals via an antenna in a wearable device, as described above. The process of computing latitude, longitude, altitude, and time is described above with respect to FIG. 8.

At 920, process 900 can include calculating a plurality of geographic locations of the wearable device over time based at least in part on the plurality of GNSS signals. For example, the wearable device (e.g., using processing unit(s) 1510, memory 1560, DSP 1520, bus 1505 and/or the like as illustrated in FIG. 15 and described below using processing unit(s) 1510, memory 1560, GNSS receiver 1580, GNSS antenna 1582, and/or the like as illustrated in FIG. 15 and described below) can calculate a plurality of geographic locations of the wearable device over time based at least in part on the plurality of GNSS signals, as described above.

At 930, process 900 can include storing the plurality of geographic locations and associated time stamps in a memory of the wearable device. For example, the wearable device (e.g., using processing unit(s) 1510, memory 1560, GNSS receiver 1580, bus 1505, and/or the like as illustrated in FIG. 15 and described below) can store the geographic locations and associated time stamps in a memory of the wearable device, as described above. The memory of the wearable device can include a solid-state memory (e.g., a flash memory).

At 940, process 900 can include measuring a depth of the wearable device using a pressure sensor on the wearable device that correlates a detected pressure to the depth. As depth increases, the pressure against the wearable device increases. For example, the wearable device (e.g., using processing unit(s) 1510, memory 1560, sensors 1540 (e.g., a pressure sensor 1542), and/or the like as illustrated in FIG. 15 and described below) can measure a depth of the wearable device using a pressure sensor on the wearable device that correlates a detected pressure to the depth, as described above. Pressure transducers have a sensing element of constant area and respond to force applied to this area by fluid pressure. The force applied will deflect the diaphragm inside the pressure transducer. The deflection of the internal diaphragm is measured and converted into an electrical output. The measured pressure can be correlated to a depth.

At 950, process 900 can include determining if the measured depth exceeds a threshold depth. The threshold depth can be determined by the maximum depth for reception of GNSS signals by the wearable device. The threshold depth can be a few centimeters to a few tens of centimeters in depth. If the threshold depth is exceeded, the process 900 can include determining a historical speed of the wearable device based at least on the geographic locations and the associated times saved in the memory of the wearable device. For example, the wearable device (e.g., using processing unit(s) 1510, memory 1560, sensors 1540 (e.g., pressure sensor 1542) and/or the like as illustrated in FIG. 15 and described below) can determine if the measured depth exceeds a threshold depth, as described above. If the measured depth does not exceed the threshold depth, the wearable device can continue to measure depth as shown in block 940.

At 960, process 900 can include determining a historical speed of the wearable device based at least on the stored geographic locations and associated time stamps that are stored in the memory of the wearable device. For example, the wearable device (e.g., using processing unit(s) 1510, memory 1560, DSP 1520, and/or the like as illustrated in FIG. 15 and described below) can calculate the distance between the stored geographic locations and the time difference between the time stamps associated with the stored geographic positions to determine a speed. The calculated speed value can be stored in the memory of the wearable device.

At 970, process 900 can include determining a direction of motion of the wearable device based at least in part on a magnetic signature received on a magnetometer of the wearable device. The earth's magnetic field resembles that of a simple bar magnet. This magnetic dipole has its field lines originating at a point near the south pole and terminating at a point near the north pole. These points are referred to as the magnetic poles. These field lines vary in both strength and direction about the face of the earth. In North America the field lines point downward toward north at an angle roughly 70 degrees into the earth's surface. This angle is called the magnetic angle of inclination (Ø). The direction and strength of the earth's magnetic field (He) can be represented by the three axis values Hx, Hy, and Hz. The Hx and Hy information can be used to determine compass headings in reference to the magnetic poles. It is the earth's rotational axis that defines the geographic north and south poles that can be used for map references. There is a discrepancy of about 11.5 degrees between the geographic poles and the magnetic poles. A value can be applied to the magnetic direction to correct for this called the declination angle. This has been mapped across the globe and takes into account other factors such as large iron deposits and other natural anomalies. A magnetic reading in central California, for example, would indicate 16° to the east when pointing toward true geographic north.

To determine compass headings using a magnetometer, the device must be level to the earth's surface, there should not be any ferrous materials interfering with the earth's field and the declination angle must be known. Various tilt compensation circuits and techniques can be used to normalize a magnetometer reading that is not level. There are also more sophisticated algorithms to account for nearby ferrous materials to correct for their effect on the earth's field. A compass heading can be determined by using just the Hx and Hy component of the earth's magnetic field, that is, the directions planar with the earth's surface. Hold the magnetometer flat in an open area and note the Hx and Hy magnetic readings. These readings vary as the magnetometer is rotated in a circle. The maximum value of Hx and Hy depend on the strength of the earth's field at that point. The magnetic compass heading can be determined (in degrees) from the magnetometer's x and y readings by using the following set of equations:

$$\text{Direction } (y > 0) = 90 - \left[\text{arcTAN}\left(\frac{x}{y}\right)\right] * 180,$$

$$\text{Direction } (y < 0) = 270 - \left[\text{arcTAN}\left(\frac{x}{y}\right)\right] * 180,$$

$$\text{Direction } (y = 0, X < 0) = 180, \text{ and}$$

$$\text{Direction } (y = 0, X > 0) = 0,$$

To determine true north heading, the appropriate declination angle can be added or subtracted.

For example, the wearable device (e.g., using processing unit(s) 1510, memory 1560, GNSS receiver 1580, GNSS antenna 1582, a magnetometer 1546 and/or the like as illustrated in FIG. 15 and described below) can determine a direction of motion of the wearable device based at least in part on a magnetic signature received on a magnetometer of the wearable device, as described above.

At 980, process 900 can include determining one or more underwater geographic locations of the wearable device over time using the historical speed and the direction of motion. The process 900 can be known as underwater dead reckoning. For example, the wearable device (e.g., using processing unit(s) 1510, memory 1560, a DSP 1520, and/or the like as illustrated in FIG. 15 and described below) can determine one or more underwater geographic locations of the wearable device over time using the historical speed and the direction of motion, as described above.

At 990, process 900 can include saving the one or more underwater geographic locations of the wearable device to the memory. For example, the wearable device (e.g., using processing unit(s) 1510, memory 1560, a DSP 1520, and/or the like as illustrated in FIG. 15 and described below) can save the one or more underwater geographic locations of the wearable device to the memory, as described above.

Process 900 can include additional implementations, such as any single implementation or any combination of implementations described below and/or in connection with one or more other processes described elsewhere herein. It should be appreciated that the specific steps illustrated in FIG. 9 can provide particular techniques for compensating for the attenuation of GNSS signals during water immersion activities according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 9 can include multiple sub-steps that can be performed in various sequences as appropriate to the individual step. Furthermore, additional steps can be added or removed depending on the particular applications. One of ordinary skill in the art would recognize many variations, modifications, and alternatives.

In some implementations, process 900 includes detecting a second plurality of GNSS signals at the antenna of the wearable device. Upon detecting the second plurality of GNSS signals the process can include calculating an updated position of the wearable device based at least in part on the second plurality of GNSS signals. The process 900 can include storing the updated position of the wearable device in the memory.

In some implementations, process 900 includes generating a message comprising a calculated speed, the determined geographic location, the determined direction of motion, or a combination thereof. The process can include sending, via a wireless protocol, the message to a second electronic device. The second electronic device can include a mobile device, a tablet, a laptop computer, a server, or another wearable device (e.g., smart goggles, smart mask).

Although FIG. 9 shows example steps of process 900, in some implementations, process 900 can include additional steps, fewer steps, different steps, or differently arranged steps than those depicted in FIG. 9. Additionally, or alternatively, two or more of the steps of process 900 can be performed in parallel.

In one aspect, a wearable device can include a communication interface, a memory, and one or more processing units communicatively coupled with the communication interface and the memory and configured to cause the wearable device to perform the methods described above.

In another aspect, a non-transitory computer-readable medium can include a plurality of instructions stored thereon, the plurality of instructions, when executed on a processor, causing the processor to perform the methods described above.

Figure 10:
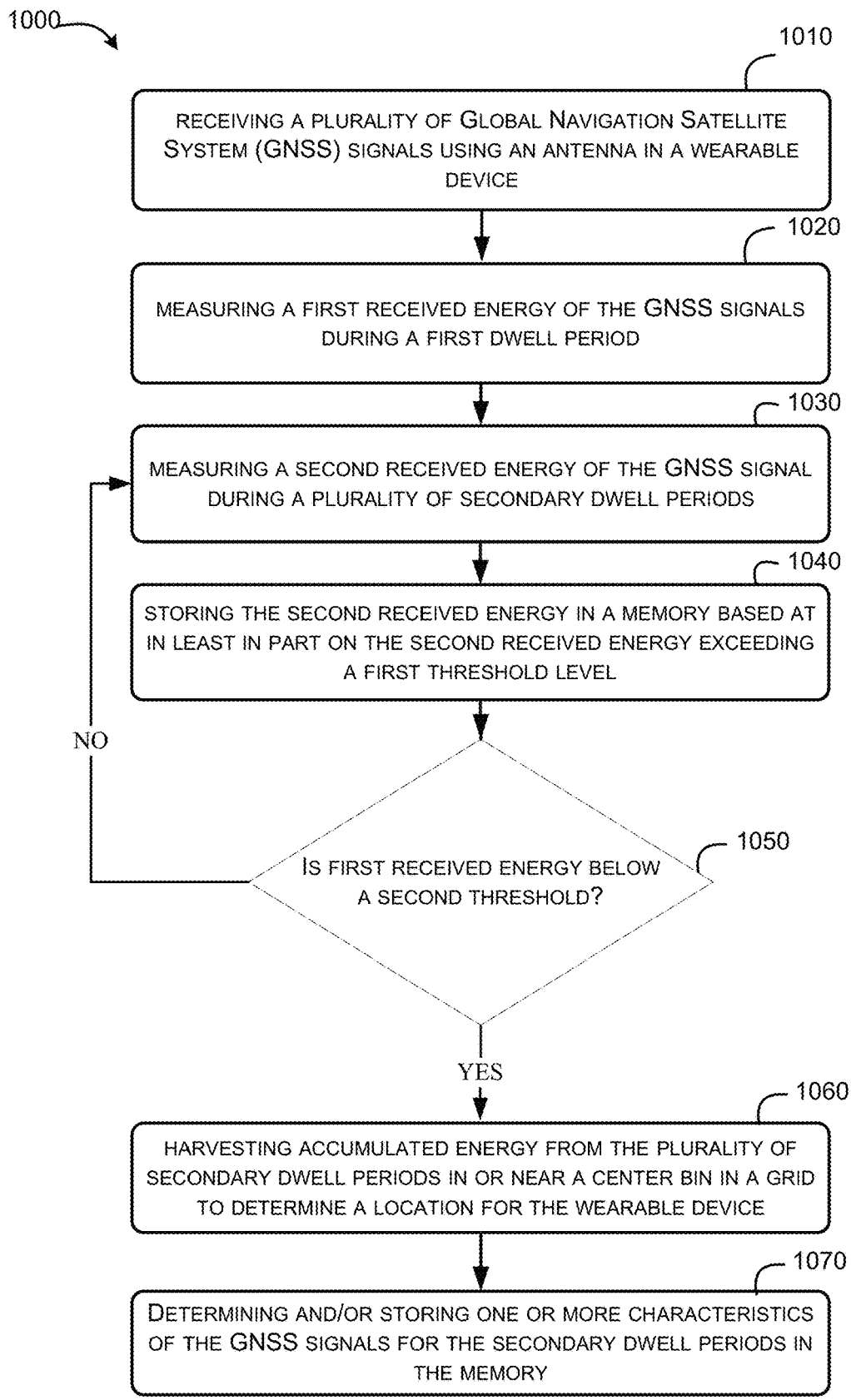
FIG. 10 illustrates an exemplary flow chart of a process for compensating for attenuation of GNSS signals during water immersion activities.

FIG. 10 illustrates an exemplary flow chart of a process 1000 for compensating for attenuation of GNSS signals during water immersion activities. In some implementations, one or more process blocks of FIG. 10 can be performed by a wearable device described herein, such as wearable device 204, 400, 500, or 600. In some implementations, one or more process blocks of FIG. 10 can be performed by another device or a group of devices separate from or including the wearable device.

At 1010, process 1000 can include receiving a plurality of GNSS signals using an antenna in a wearable device. When a GNSS receiver searches for a satellite, the GNSS receiver correlates the signal (which is typically down in the noise because the signal strength of GNSS signals is very low) against a known code for a given satellite. This is done in parallel for a grid of time versus frequency, called a search window. Each cell in the grid is called a bin, where the GNSS receiver accumulates energy from the correlation against the code that occurred in that time and frequency space. Once the GNSS receiver has acquired a GNSS signal, the receiver can lock onto the satellite signal that is occurring at the time and frequency space. As the satellites are moving, there is a Doppler shift associated with a particular bin. However, if the signal is cutting in and out, as the watch drops in and out of the water or otherwise progresses through a swim stroke, the receiver would need to relock onto the signal when the hand comes out of the water or at a shallow enough depth that the GNSS receiver can receive signal.

In various embodiments, the GNSS signals can be collected based on a timing of a swim stroke. One or more sensors (e.g., a MEMS sensor, a gyro, or a magnetometer) can be used to determine a position of the arm during the stroke. GNSS signal collection can be timed based on the stroke to a time period where GNSS signal acquisition may be possible (e.g., a wearable device on an arm close to the surface of the water or out of the water).

For example, the wearable device (e.g., using processing unit(s) 1510, memory 1560, GNSS receiver 1580, GNSS antenna 1582, and/or the like as illustrated in FIG. 15 and described below) can receive a plurality of GNSS signals using an antenna in a wearable device, as described above.

At 1020, process 1000 can include measuring a first received energy of the GNSS signals during a first dwell period. In various embodiments, the first dwell period is about one second in duration. In theory, the wearable device should be at or close to where the GNSS receiver had it locked prior to any disruption and the clock should not have drifted significantly. At the end of the first dwell period (e.g., 1-sec dwell period), there may not be enough signal above a threshold for the first dwell duration because lots of noise may have accumulated and the signal energy may not be enough. The noise could be from other satellites, other constellations, terrestrial sources, internal noise, etc.

For example, the wearable device (e.g., using processing unit(s) 1510, memory 1560, GNSS receiver 1580, GNSS antenna 1582, DSP 1520 and/or the like as illustrated in FIG. 15 and described below) can measure a first received energy of the GNSS signals during a first dwell period, as described above.

At 1030, process 1000 can include measuring a second received energy of the GNSS signal during a plurality of secondary dwell periods, where a duration of each of the plurality of secondary dwell periods is shorter than the first dwell period. This is based on the assumption that the GNSS signal is accumulating in at least some parts of the stroke, that the GNSS receiver can look to shorter duration bins in or near the main center bins to harvest accumulated energy that occurred in areas where there was ample signal energy to correlate against, thus ignoring the parts of the stroke where the noise blocked out the signal. For example, the wearable device (e.g., using processing unit(s) 1510, memory 1560, GNSS receiver 1580, GNSS antenna 1582, DSP 1520, and/or the like as illustrated in FIG. 15 and described below) can measure a second received energy of the GNSS signal during a plurality of secondary dwell periods, as described above. In some implementations, a duration of each of the plurality of secondary dwell periods is shorter than the first dwell period.

At 1040, process 1000 can include storing the second received energy in a memory based at least in part on the second received energy exceeding a first threshold level. For example, the wearable device (e.g., using processing unit(s) 1510, memory 1560, GNSS receiver 1580, GNSS antenna 1582, DSP 1520, and/or the like as illustrated in FIG. 15 and described below) can store the second received energy in a memory based at least in part on the second received energy exceeding a first threshold level, as described above.

At 1050, process 1000 can include determining whether the first received energy is below a second threshold level. If the first received energy is below the second threshold level, the process 1000 can include, at 1060, harvesting accumulated energy from the plurality of secondary dwell periods in or near a center bin to determine a location for the wearable device. For example, the wearable device (e.g., using processing unit(s) 1510, memory 1560, GNSS receiver 1580, GNSS antenna 1582, DSP 1520, and/or the like as illustrated in FIG. 15 and described below) can determine whether the first received energy is below the second threshold level, as described above.

At 1070, process 1000 can include storing one or more characteristics of the GNSS signals for the secondary dwell periods in the memory. For example, the wearable device (e.g., using processing unit(s) 1510, memory 1560, GNSS receiver 1580, GNSS antenna 1582, and/or the like as illustrated in FIG. 15 and described below) can store one or more characteristics of the GNSS signals for the secondary dwell periods in the memory, as described above. The one or more characteristics can include the various timing information that can be used to determine a location of the wearable device.

In various embodiments, the plurality of secondary dwell periods can be mapped to a particular stroke pattern. In this way, collection of GNSS signals can be timed to correspond to periods when GNSS signals would be optimized because during that portion of the stroke the wearable device may be near the surface of the water or out of the water. One or more other signals from a variety of sensors (e.g., an accelerometer, a gyro meter, a magnetometer) in the wearable device can be used to correlate to the stroke location to time the collection of GNSS information.

Process 1000 can include additional implementations, such as any single implementation or any combination of implementations described below and/or in connection with one or more other processes described elsewhere herein. It should be appreciated that the specific steps illustrated in FIG. 10 provide particular techniques for compensating for attenuation of GNSS signals according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 10 can include multiple sub-steps that can be performed in various sequences as appropriate to the individual step. Furthermore, additional steps can be added or removed depending on the particular applications. One of ordinary skill in the art would recognize many variations, modifications, and alternatives.

Although FIG. 10 shows example steps of process 1000, in some implementations, process 1000 can include additional steps, fewer steps, different steps, or differently arranged steps than those depicted in FIG. 10. Additionally, or alternatively, two or more of the steps of process 1000 can be performed in parallel.

In one aspect, a wearable device can include a communication interface, a memory, and one or more processing units communicatively coupled with the communication interface and the memory and configured to cause the wearable device to perform the methods described above.

In another aspect, a non-transitory computer-readable medium can include a plurality of instructions stored thereon, where the plurality of instructions, when executed on a processor, cause the processor to perform the methods described above.

Figure 11:
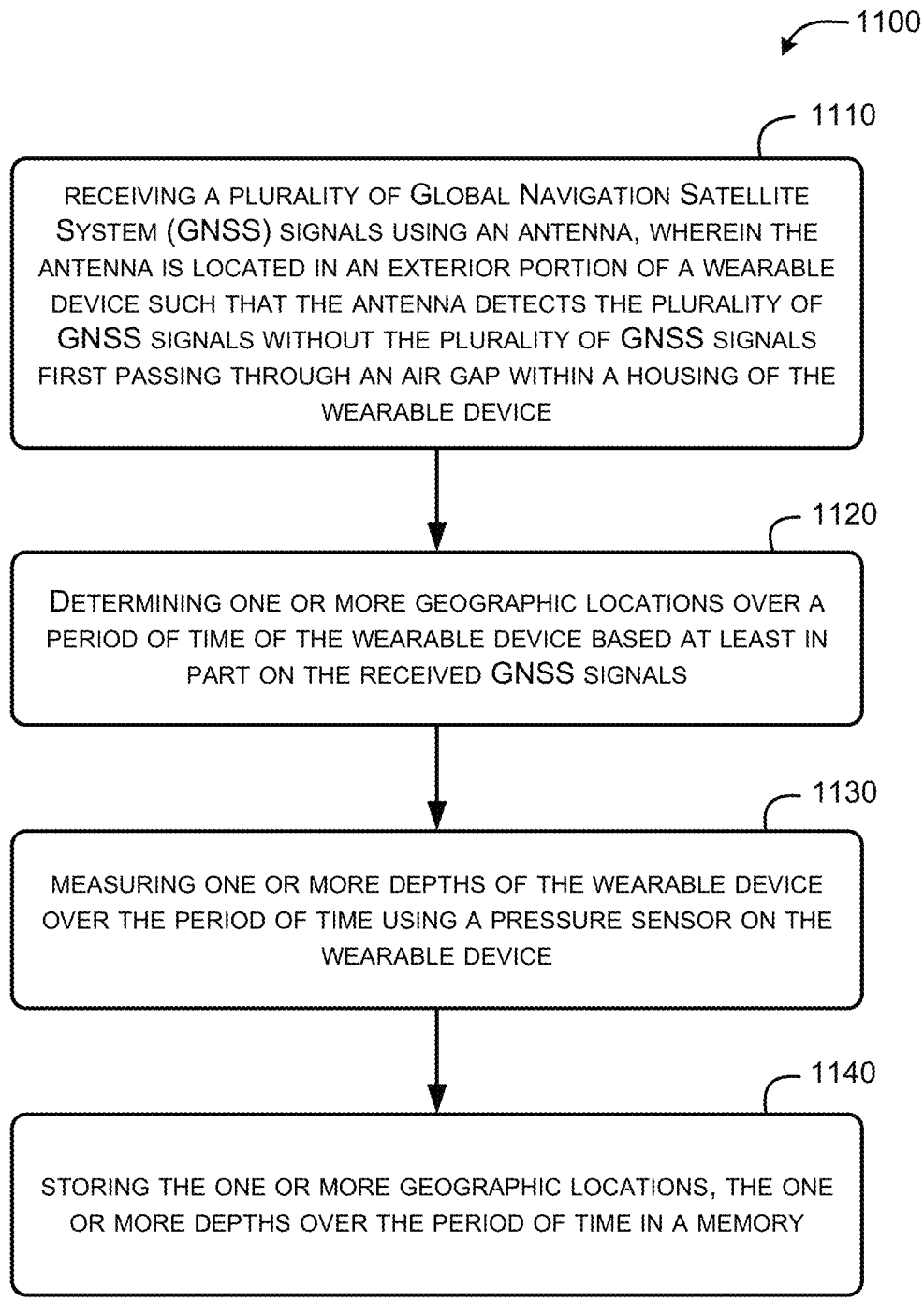
FIG. 11 illustrates an exemplary flow chart of a process for compensating for attenuation of GNSS signals during water immersion activities.

FIG. 11 illustrates an exemplary flow chart of a process 1100 for compensating for attenuation of GNSS signals during water immersion activities. In some implementations, one or more process blocks of FIG. 11 can be performed by a wearable device described herein, such as wearable device 204, 400, 500, or 600. In some implementations, one or more process blocks of FIG. 11 can be performed by another device or a group of devices separate from or including the wearable device.

At 1110, process 1100 can include receiving a plurality of GNSS timing signals using an antenna, where the antenna is located in an exterior portion of a wearable device such that the antenna detects the plurality of GNSS signals without the plurality of GNSS signals first passing through an air gap within a case or housing of the wearable device. For example, the wearable device (e.g., using processing unit(s) 1510, memory 1560, GNSS receiver 1580, GNSS antenna 1582, and/or the like as illustrated in FIG. 15 and described below) can receive a plurality of GNSS signals 206 using an antenna, as described above. In some implementations, the antenna is located in an exterior portion of a wearable device such that the antenna detects the plurality of GNSS signals without the plurality of GNSS signals first passing through an air gap within a housing of the wearable device. The process of computing latitude, longitude, altitude, and time is described above with respect to, for example, FIG. 8.

At 1120, process 1100 can include calculating one or more geographic locations of the wearable device over a period of time based at least in part on the received GNSS signals. For example, the wearable device (e.g., using processing unit(s) 1510, memory 1560, GNSS receiver 1580, GNSS antenna 1582, and/or the like as illustrated in FIG. 15 and described below) can calculate one or more geographic locations of the wearable device over a period of time based at least in part on the received GNSS signals, as described above.

At 1130, process 1100 can include measuring one or more depths of the wearable device over the period of time using a pressure sensor on the wearable device. The method of calculating depth is described above with regard to, for example, FIG. 9. For example, the wearable device (e.g., using processing unit(s) 1510, memory 1560, GNSS receiver 1580, GNSS antenna 1582, pressure sensor 1542, and/or the like as illustrated in FIG. 15 and described below) can measure one or more depths of the wearable device over the period of time using a pressure sensor on the wearable device, as described above.

At 1140, process 1100 can include storing the one or more geographic locations, the associated times, and the one or more depths over the period of time in a memory of the wearable device. The memory can be a solid-state memory (e.g., a flash memory). For example, the wearable device (e.g., using processing unit(s) 1510, memory 1560, GNSS receiver 1580, GNSS antenna 1582, and/or the like as illustrated in FIG. 15 and described below) can store the one or more geographic locations, the one or more depths over the period of time in a memory of the wearable device, as described above.

The one or more geographic locations, the associated times, and the one or more depths over the period of time can be used to plot and display a user's pattern above and below the water. In various embodiments, the location data can be synchronized with a video feed captured on an image/video capture device attached to a user's mask. In this way the user location can be displayed on a map along with visual information captured from the image/capture video device.

In one example, the swim lanes may be displayed to the user through AR/VR goggles. Locations of other users or other objects in the water, such as the lanes and distance information of the objects, may also be determined and provided to the AR/VR goggles, such that the AR/VR goggles may display the swim lanes and the locations of other users/objects in the swim lanes to the user for collision avoidance and the like. In some implementations, the AR/VR goggles may also provide other information to the user, such as instructions for collision avoidance or information (e.g., speed, direction, and location) of other users, for example, during a competition.

In various embodiments, process 1100 can include sending the one or more geographic locations, the associated times, and the one or more depths stored over the period of time to a second electronic device via a wired or wireless protocol. In some embodiments, the wireless protocol can be Bluetooth. In some embodiments, the wireless protocol can be Wi-Fi. The second electronic device can be a mobile device, a tablet, or a laptop computer. In some embodiments, the second electronic device can be a second wearable device. The second wearable device can be smart goggles or smart masks. The second wearable device can be a smart watch worn by a second user. The second electronic device can be a server. The one or more geographic locations, the associated times, and the one or more depths stored over the period of time can be stored in a cloud storage device.

Process 1100 can include additional implementations, such as any single implementation or any combination of implementations described below and/or in connection with one or more other processes described elsewhere herein. It should be appreciated that the specific steps illustrated in FIG. 11 provide particular techniques for compensating for attenuation of GNSS signals according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 11 can include multiple sub-steps that can be performed in various sequences as appropriate to the individual step. Furthermore, additional steps can be added or removed depending on the particular applications. One of ordinary skill in the art would recognize many variations, modifications, and alternatives.

Although FIG. 11 shows example steps of process 1100, in some implementations, process 1100 can include additional steps, fewer steps, different steps, or differently arranged steps than those depicted in FIG. 11. Additionally, or alternatively, two or more of the steps of process 1100 can be performed in parallel.

In one aspect, a wearable device can include a communication interface, a memory, and one or more processing units communicatively coupled with the communication interface and the memory and configured to cause the wearable device to perform the methods described above.

In another aspect, a non-transitory computer-readable medium can include a plurality of instructions stored thereon, where the plurality of instructions when executed on a processor cause the processor to perform the methods described above.

Figure 12:
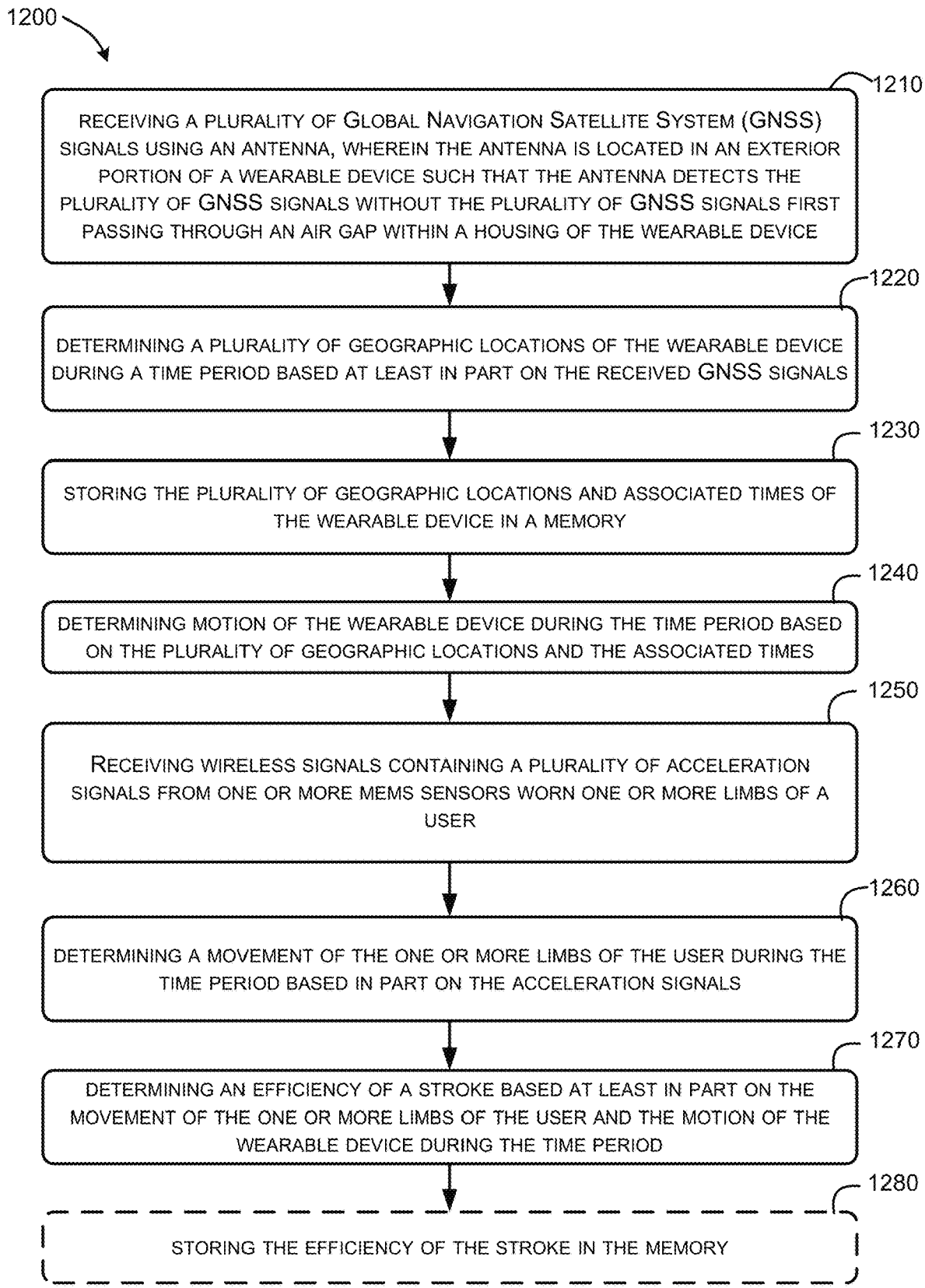
FIG. 12 illustrates an exemplary flow chart of a process for calculating an efficiency of a swim stroke while compensating for attenuation of GNSS signals during water immersion activities.

FIG. 12 illustrates an exemplary flow chart of a process 1200 for calculating an efficiency of a swim stroke while compensating for attenuation of GNSS signals during water immersion activities. In some implementations, one or more process blocks of FIG. 12 can be performed by a wearable device described herein, such as wearable device 204, 400, 500, or 600. In some implementations, one or more process blocks of FIG. 12 can be performed by another device or a group of devices separate from or including the wearable device.

At 1210, process 1200 can include receiving a plurality of GNSS signals using an antenna, where the antenna is located in an exterior portion of the wearable device such that the antenna detects the plurality of GNSS signals without the plurality of GNSS signals first passing through an air gap within a housing of the wearable device. For example, the wearable device (e.g., using processing unit(s) 1510, memory 1560, GNSS receiver 1580, GNSS antenna 1582, and/or the like as illustrated in FIG. 15 and described below) can receive a plurality of GNSS signals using an antenna (e.g., GNSS antenna 1582), as described above. In some implementations, the antenna is located in an exterior portion of a wearable device such that the antenna detects the plurality of GNSS signals without the plurality of GNSS signals first passing through an air gap within a housing of the wearable device.

At 1220, process 1200 can include calculating a plurality of geographic locations of the wearable device during a time period based at least in part on the received GNSS signals. For example, the wearable device (e.g., using processing unit(s) 1510, memory 1560, GNSS receiver 1580, GNSS antenna 1582, and/or the like as illustrated in FIG. 15 and described below) can calculate a plurality of geographic locations of the wearable device during a time period based at least in part on the received GNSS signals, as described above. The process of computing latitude, longitude, altitude, and time is described above with respect to FIG. 8.

At 1230, process 1200 can include storing the plurality of geographic locations and associated times of the wearable device in a memory. The memory can be a solid-state memory (e.g., a flash memory). For example, the wearable device (e.g., using processing unit(s) 1510, memory 1560, GNSS receiver 1580, GNSS antenna 1582, and/or the like as illustrated in FIG. 15 and described below) can store the plurality of geographic locations and associated times of the wearable device in a memory, as described above.

At 1240, process 1200 can include determining motion of the wearable device during the time period based on the plurality of geographic locations and the associated times. The velocity for the wearable device can be calculated by comparing the stored plurality of geographic locations and associated times. In various embodiments, the calculated velocity can be stored in the memory. For example, the wearable device (e.g., using processing unit(s) 1510, memory 1560, GNSS receiver 1580, GNSS antenna 1582, and/or the like as illustrated in FIG. 15 and described below) can determine motion of the wearable device during the time period based on the plurality of geographic locations and the associated times, as described above.

At 1250, process 1200 can include receiving wireless signals containing a plurality of acceleration signals from one or more motion sensors, such as microelectromechanical (MEMS) motion sensors (e.g., accelerometers), worn on one or more limbs of a user. MEMS can be made up of components between 1 and 110 micrometers in size (i.e., 0.001 to 0.1 mm), and MEMS devices generally range in size from 20 micrometers to a millimeter (i.e., 0.02 to 1.0 mm). They usually consist of a central unit that processes data (an integrated circuit chip such as microprocessor) and several components that interact with the surroundings (e.g., micro sensors). Because of the large surface area to volume ratio of MEMS, forces produced by ambient electromagnetism (e.g., electrostatic charges and magnetic moments), and fluid dynamics (e.g., surface tension and viscosity) are more important design considerations than with larger scale mechanical devices. For example, the wearable device (e.g., using processing unit(s) 1510, memory 1560, GNSS receiver 1580, GNSS antenna 1582, MEMS sensors 1544 and/or the like as illustrated in FIG. 15 and described below) can receive wireless signals containing a plurality of acceleration signals from one or more MEMS sensors worn on one or more limbs of a user, as described above.

At 1260, process 1200 can include determining a movement of the one or more limbs of a user during the time period based in part on the acceleration signals. For example, the wearable device (e.g., using processing unit(s) 1510, memory 1560, GNSS receiver 1580, GNSS antenna 1582, MEMS sensors 1544 and/or the like as illustrated in FIG. 15 and described below) can determine a movement of the one or more limbs of a user during the time period based in part on the acceleration signals, as described above.

At 1270, process 1200 can include calculating an efficiency of a stroke based at least in part on the movement of the one or more limbs of the user and the motion of the wearable device during the time period. For example, the wearable device (e.g., using processing unit(s) 1510, memory 1560, DSP 1520, and/or the like as illustrated in FIG. 15 and described below) can calculate an efficiency of a stroke based at least in part on the movement of the one or more limbs of the user and the motion of the wearable device during the time period, as described above.

In various embodiments, the MEMS data can be used as a virtual coach. For example, if the user stops kicking, as detected by one or more sensors on a user's legs or feet, feedback can be provided to the user. Such feedback can include a haptic or aural feedback from the wearable device.

At 1280, process 1200 can include storing the efficiency of the stroke in the memory. The memory can be a solid-state memory device (e.g., a flash memory). For example, the wearable device (e.g., using processing unit(s) 1510, memory 1560, and/or the like as illustrated in FIG. 15 and described below) can store the efficiency of the stroke in the memory, as described above.

Process 1200 can include additional implementations, such as any single implementation or any combination of implementations described below and/or in connection with one or more other processes described elsewhere herein. It should be appreciated that the specific steps illustrated in FIG. 12 provide particular techniques for calculating an efficiency of a swim stroke while compensating for attenuation of GNSS signals during water immersion activities according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 12 can include multiple sub-steps that can be performed in various sequences as appropriate to the individual step. Furthermore, additional steps can be added or removed depending on the particular applications. One of ordinary skill in the art would recognize many variations, modifications, and alternatives.

Although FIG. 12 shows example steps of process 1200, in some implementations, process 1200 can include additional steps, fewer steps, different steps, or differently arranged steps than those depicted in FIG. 12. Additionally, or alternatively, two or more of the steps of process 1200 can be performed in parallel.

In one aspect, a wearable device can include a communication interface, a memory, and one or more processing units communicatively coupled with the communication interface and the memory and configured to cause the wearable device to perform the methods described above.

In another aspect, a non-transitory computer-readable medium can include a plurality of instructions stored thereon, the plurality of instructions, when executed on a processor, causing the processor to perform the methods described above.

Figure 13:
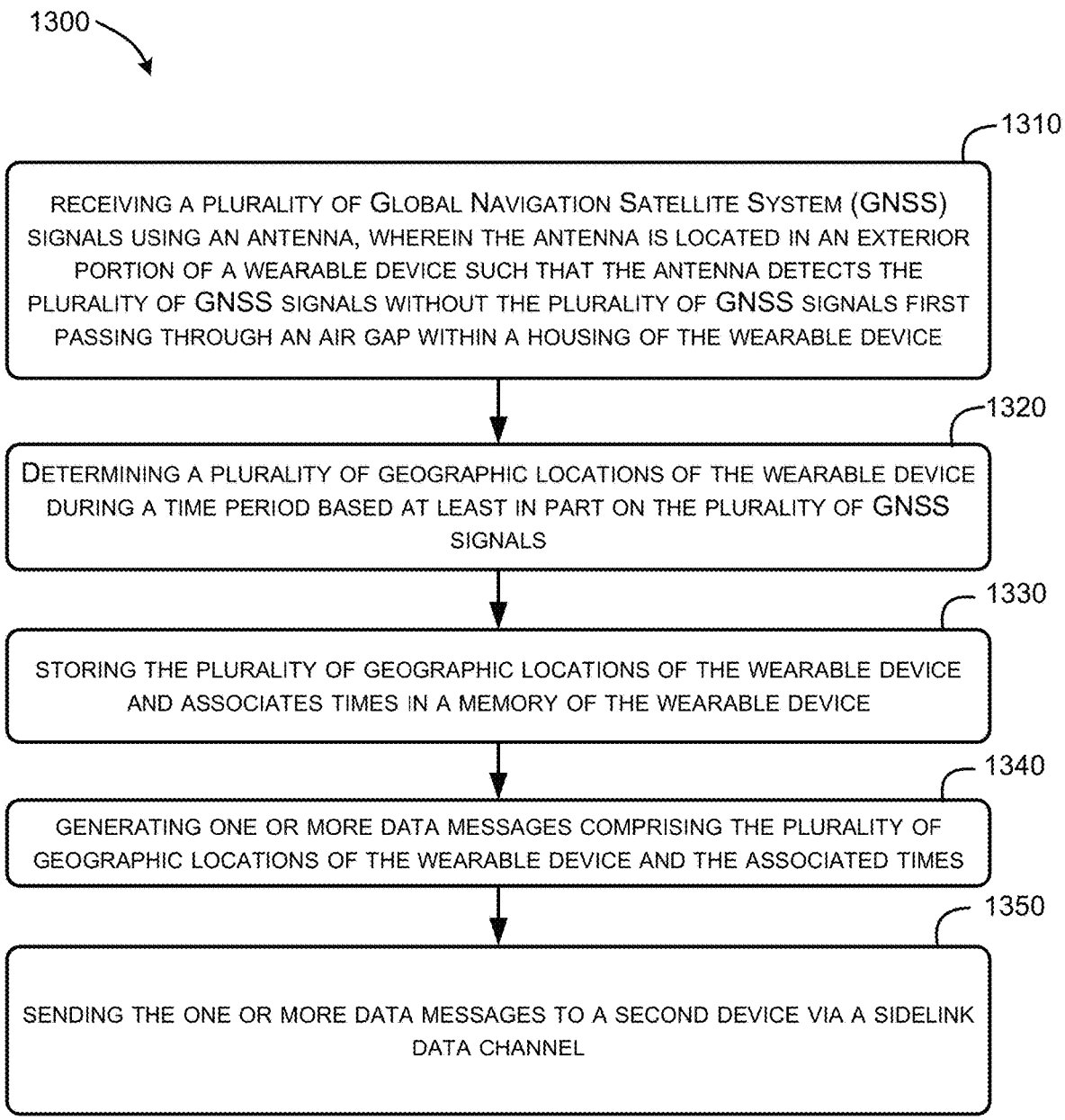
FIG. 13 illustrates an exemplary flow chart of a process for compensating for attenuation of GNSS signals and sharing the information during water immersion activities.

FIG. 13 illustrates an exemplary flow chart of a process 1300 for compensating for attenuation of GNSS signals and sharing the information during water immersion activities. In some implementations, one or more process blocks of FIG. 13 can be performed by a wearable device described herein, such as wearable device 204, 400, 500, or 600. In some implementations, one or more process blocks of FIG. 13 can be performed by another device or a group of devices separate from or including the wearable device.

At 1310, process 1300 can include receiving a plurality of GNSS signals using an antenna, wherein the antenna is located in an exterior portion of a wearable device such that the antenna detects the plurality of GNSS signals without the plurality of GNSS signals first passing through an air gap within a housing of the wearable device. For example, the wearable device (e.g., using processing unit(s) 1510, memory 1560, GNSS receiver 1580, GNSS antenna 1582, and/or the like as illustrated in FIG. 15 and described below) can receive a plurality of GNSS signals using an antenna (e.g., GNSS antenna 1582), as described above. In some implementations, the antenna is located in an exterior portion of a wearable device such that the antenna detects the plurality of GNSS signals without the plurality of GNSS signals first passing through an air gap within a housing of the wearable device.

At 1320, process 1300 can include calculating a plurality of geographic locations of the wearable device during a time period based at least in part on the plurality of GNSS signals. For example, the wearable device (e.g., using processing unit(s) 1510, memory 1560, GNSS receiver 1580, GNSS antenna 1582, and/or the like as illustrated in FIG. 15 and described below) can calculate a plurality of geographic locations of the wearable device during a time period based at least in part on the plurality of GNSS signals, as described above. The process of computing latitude, longitude, altitude, and time is described above with respect to FIG. 8.

At 1330, process 1300 can include storing the plurality of geographic locations of the wearable device and associated times in a memory of the wearable device. The memory can be a solid-state memory (e.g., a flash memory). For example, the wearable device (e.g., using processing unit(s) 1510, memory 1560, GNSS receiver 1580, GNSS antenna 1582, and/or the like as illustrated in FIG. 15 and described below) can store the plurality of geographic locations of the wearable device and associated times in a memory of the wearable device, as described above.

At 1340, process 1300 can include generating one or more data messages comprising the plurality of geographic locations of the wearable device and the associated times. For example, the wearable device (e.g., using processing unit(s) 1510, memory 1560, the wireless communication system 1530, and/or the like as illustrated in FIG. 15 and described below) can generate one or more data messages comprising the plurality of geographic locations of the wearable device and the associated times, as described above.

At 1350, process 1300 can include sending the one or more data messages to a second device via a sidelink data channel. For example, the wearable device (e.g., using processing unit(s) 1510, memory 1560, GNSS receiver 1580, GNSS antenna 1582, and/or the like as illustrated in FIG. 15 and described below) can send the one or more data messages to a second device via a sidelink data channel, as described above.

Process 1300 can include additional implementations, such as any single implementation or any combination of implementations described below and/or in connection with one or more other processes described elsewhere herein. It should be appreciated that the specific steps illustrated in FIG. 13 provide particular techniques for compensating for attenuation of GNSS signals and sharing the information during water immersion activities according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 13 can include multiple sub-steps that can be performed in various sequences as appropriate to the individual step. Furthermore, additional steps can be added or removed depending on the particular applications. One of ordinary skill in the art would recognize many variations, modifications, and alternatives.

In some implementations, process 1300 includes receiving via the sidelink data channel one or more second data messages from one or more second wearable devices, wherein the one or more second data is messaging comprise the geographic locations of the one or more second wearable devices.

In various embodiments, data from one or more users can be crowdsourced and analyzed. The movement of multiple users in an area can be used to determine current information because the velocity of the user is a combination of user's motion and drift associated with a current.

Although FIG. 13 shows example steps of process 1300, in some implementations, process 1300 can include additional steps, fewer steps, different steps, or differently arranged steps than those depicted in FIG. 13. Additionally, or alternatively, two or more of the steps of process 1300 can be performed in parallel.

In one aspect, a wearable device can include a communication interface, a memory, and one or more processing units communicatively coupled with the communication interface and the memory and configured to cause the wearable device to perform the methods described above.

In another aspect, a non-transitory computer-readable medium can include a plurality of instructions stored thereon, the plurality of instructions, when executed on a processor, causing the processor to perform operations comprising the methods described above.

Figure 14:
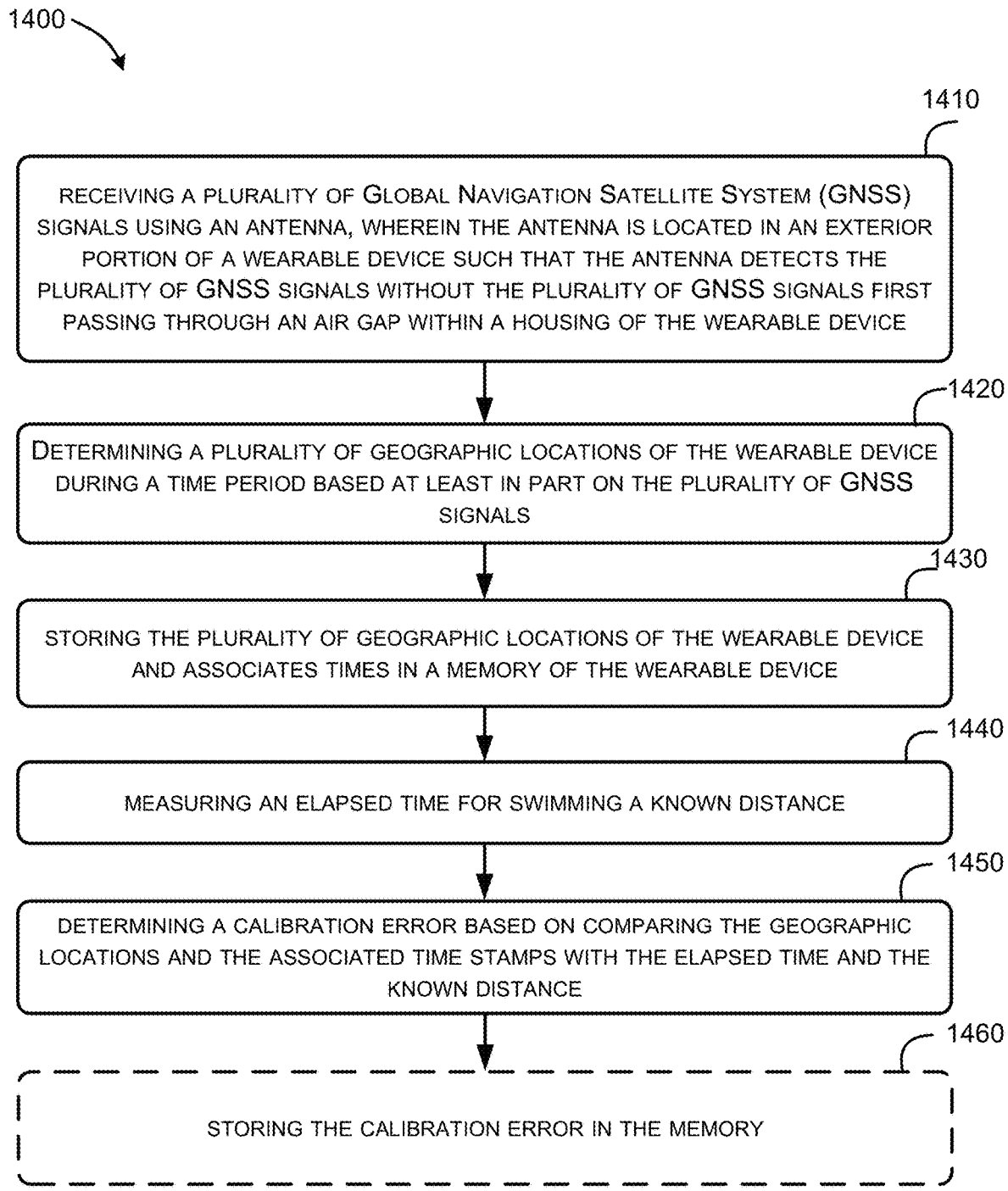
FIG. 14 illustrates an exemplary flow chart of a process for compensating for attenuation of GNSS signals during water immersion activities.

FIG. 14 illustrates an exemplary flow chart of a process 1400 for compensating for attenuation of GNSS signals and calibrating sensors of a wearable device during water immersion activities. In some implementations, one or more process blocks of FIG. 14 can be performed by a wearable device described herein, such as wearable device 204, 400, 500, or 600. In some implementations, one or more process blocks of FIG. 14 can be performed by another device or a group of devices separate from or including the wearable device.

At 1410, process 1400 can include receiving a plurality of GNSS signals using an antenna, wherein the antenna is located in an exterior portion of a wearable device such that the antenna detects the plurality of GNSS signals without the plurality of GNSS signals first passing through an air gap within a housing of the wearable device. For example, the wearable device (e.g., using processing unit(s) 1510, memory 1560, GNSS receiver 1580, GNSS antenna 1582, and/or the like as illustrated in FIG. 15 and described below) can receive a plurality of GNSS signals using an antenna (e.g., GNSS antenna 1582), as described above. In some implementations, the antenna is located in an exterior portion of a wearable device such that the antenna detects the plurality of GNSS signals without the plurality of GNSS signals first passing through an air gap within a housing of the wearable device.

At 1420, process 1400 can include calculating a plurality of geographic locations of the wearable device over a time period based at least in part on the received GNSS signals. For example, the wearable device (e.g., using processing unit(s) 1510, memory 1560, GNSS receiver 1580, GNSS antenna 1582, and/or the like as illustrated in FIG. 15 and described below) can calculate a plurality of geographic locations of the wearable device over a time period based at least in part on the received GNSS signals, as described above.

At 1430, process 1400 can include storing the plurality geographic locations of the wearable device and associated times in a memory of the wearable device. For example, the wearable device (e.g., using processing unit(s) 1510, memory 1560, GNSS receiver 1580, GNSS antenna 1582, and/or the like as illustrated in FIG. 15 and described below) can store the plurality of geographic locations of the wearable device and associated times in a memory of the wearable device, as described above.

At 1440, process 1400 can include measuring an elapsed time for swimming a known distance. For example, the wearable device (e.g., using processing unit(s) 1510, memory 1560, GNSS receiver 1580, GNSS antenna 1582, and/or the like as illustrated in FIG. 15 and described below) can measure an elapsed time for swimming a known distance, as described above. The known distance can be, for example, for a swimming pool of known length (e.g., a 50-meter or 110-meter pool). The distance information can be provided to the wearable device through a user interface on the wearable device or a companion device.

At 1450, process 1400 can include comparing the geographic locations and the associated time stamps with the elapsed time and the known distance to determine a calibration error. For example, the wearable device (e.g., using processing unit(s) 1510, memory 1560, GNSS receiver 1580, GNSS antenna 1582, and/or the like as illustrated in FIG. 15 and described below) can compare the geographic locations and the associated time stamps with the elapsed time and the known distance to determine a calibration error, as described above.

At 1460, process 1400 can include storing the calibration error in the memory. For example, the wearable device (e.g., using processing unit(s) 1510, memory 1560, GNSS receiver 1580, GNSS antenna 1582, and/or the like as illustrated in FIG. 15 and described below) can store the calibration error in the memory, as described above.

Process 1400 can include additional implementations, such as any single implementation or any combination of implementations described below and/or in connection with one or more other processes described elsewhere herein. It should be appreciated that the specific steps illustrated in FIG. 14 provide particular techniques for compensating for attenuation of GNSS signals during water immersion activities according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 14 can include multiple sub-steps that can be performed in various sequences as appropriate to the individual step. Furthermore, additional steps can be added or removed depending on the particular applications. One of ordinary skill in the art would recognize many variations, modifications, and alternatives.

Although FIG. 14 shows example steps of process 1400, in some implementations, process 1400 can include additional steps, fewer steps, different steps, or differently arranged steps than those depicted in FIG. 14. Additionally, or alternatively, two or more of the steps of process 1400 can be performed in parallel.

In one aspect, a wearable device can include a communication interface, a memory, and one or more processing units communicatively coupled with the communication interface and the memory and configured to cause the wearable device to perform the methods described above.

In another aspect, a non-transitory computer-readable medium can include a plurality of instructions stored thereon, the plurality of instructions, when executed on a processor, causing the processor to perform operations comprising the methods described above.

FIG. 15 is a block diagram of an embodiment of a computer system 1500, which may be used, in whole or in part, to provide the functions of one or more network components as described in the embodiments herein. It should be noted that FIG. 15 is meant only to provide a generalized illustration of various components, any or all of which may be utilized as appropriate. FIG. 15, therefore, broadly illustrates how individual system elements may be implemented in a relatively separated or relatively more integrated manner. In addition, it can be noted that components illustrated by FIG. 15 can be localized to a single device and/or distributed among various networked devices, which may be disposed at different geographical locations.

The computer system 1500 is shown comprising hardware elements that can be electrically coupled via a bus 1505 (or may otherwise be in communication, as appropriate). The hardware elements may include processing unit(s) 1510, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1500 also may comprise one or more input devices 1570, which may comprise without limitation a mouse, a keyboard, a camera, a touchscreen, one or more buttons, one or more dials, a microphone, and/or the like; and one or more output devices 1515, which may comprise without limitation a display device, a printer, and/or the like.

The computer system 1500 may further include (and/or be in communication with) one or more non-transitory storage devices, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1500 may also include a wireless communication system 1530, which may comprise wireless communication technologies managed and controlled by a wireless communication interface, as well as wired technologies (such as Ethernet, coaxial communications, universal serial bus (USB), and the like). The wireless communication interface may send and receive wireless signals 1534 (e.g., signals according to Wi-Fi, Bluetooth, 5G NR or LTE) via wireless antenna(s) 1532. Thus the wireless communication system 1530 may comprise a modem, a network card (wireless or wired), an infrared communication device, a wireless communication device, and/or a chipset, and/or the like, which may enable the computer system 1500 to communicate on any or all of the communication networks described herein to any device on the respective network, including a User Equipment (UE), base stations and/or other transmission and reception points (TRPs), and/or any other electronic devices described herein. Hence, the wireless communication system 1530 may be used to receive and send data as described in the embodiments herein.

In many embodiments, the computer system 1500 will further comprise a memory 1560, which may comprise a RAM or ROM device, as described above. Software elements, shown as being located within the memory 1560, may comprise an operating system, device drivers, executable libraries, and/or other code, such as one or more applications, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) described above. In some cases, the storage medium might be incorporated within a computer system, such as computer system 1500. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1500 and/or might take the form of source and/or installable code, which, upon compilation and/or installation on the computer system 1500 (e.g., using any of a variety of generally available compilers, installation programs, compression/decompression utilities, etc.), then takes the form of executable code.

The wearable device 204 may include one or more sensors 1540. The sensors can include a pressure sensor 1542, a MEMS sensor 1544 and/or a magnetometer 1546. MEMS sensors 1544 can include smart sensors that include accelerometers, gyroscope, and fusion software. Microelectromechanical Systems (MEMS) Devices MEMS devices utilize modern semiconductor fabrication processes to build devices that measure real-world forces. These devices contain structures on the scale of micrometers that are created so they can move within the device. Taking advantage of Newton's three laws of motion, these moving structures can be used to detect the direction and magnitude of the device's acceleration. Additionally, using specific materials to produce these structures can make them very sensitive to magnetic fields, which allow the device to provide measurements that indicate its orientation.

One example, of a MEMS sensor for a wearable device is a Bosch BHI260AB. The BHI260AB is a smart sensor for advanced always-on sensor applications with significantly lower system power consumption of battery-powered devices. The sensor includes the new custom programmable and powerful 32-bit microcontroller, a state-of-the-art 6-axis inertial measurement unit (IMU) and a powerful software framework. The BHI260AB offers an open and flexible environment for developing sensor-based applications through a software development kit. In combination with its wide connectivity and extendibility, the BHI260AB is the versatile and ideal solution when it comes to 3D orientation, step counting, position tracking, and activity recognition or context awareness in wearables, smartphones and other mobile devices. The wearable device 204 can include a GNSS receiver 1580 that can process one or more received GNSS signals 1584 that can be captured by a GNSS antenna 1582.

Accelerometers are another sensor 1540 that can be used in a wearable device 204. The most common MEMS sensor, accelerometers are capable of sensing gravity as well as linear accelerations. MEMS devices and can be used for a variety of wearables that measure motion, ranging from walking (a modern-day pedometer) to monitoring sleep patterns to detecting seizures. Accelerometers used in wearable devices are generally specified by the maximum acceleration the device can measure. Common values for this maximum acceleration range from 2G to 16G.

Gyros are another sensor 1540 that can be incorporated into a wearable device 204. In a similar way that an accelerometer can measure linear accelerations, a gyro can measure rotational accelerations. The rotational measurements alone are generally not as useful as the measurements obtained from an accelerometer, but when used in conjunction with an accelerometer, each device can correct minor errors in the other. With these corrections, a more precise description of the user or patient's movements can be determined. Accelerometers used in wearable devices are typically specified by the maximum rotational acceleration the device can measure. Common values for this maximum acceleration range from 250 deg/s to 2000 deg/s.

A magnetometer 1546 is another type of sensor 1540 that can be incorporated into a wearable device 204. A magnetometer 1546 measures magnetic fields, primarily the magnetic field of the earth. In other words, a magnetometer 1546 is the 21st-century version of the compass. While accelerometers and gyros sense movement in 3D, these measurements are generally in relation to an unknown starting point. A magnetometer 1546 can be used to fix these relative movements to the coordinate system of the earth. Magnetometers 1546 can be used to detect a direction of travel while swimming.

These MEMS sensors can be as small as 2 mm×2 mm×1 mm individually or all three can be integrated into a single package as small as 3 mm×3 mm×1 mm. In addition, the power consumption of these devices varies depending on the data acquisition speed but can be as low as only a few micro-amps. These specifications make the sensors very suitable for including in small wearable devices in which weight and power consumption are a high priority.

GNSS receivers 1580 and GNSS antenna 1582 can be incorporated into wearable devices 204 and used for navigation. GNSS receivers 1580 in wearable devices 204 can track the distance a user moves (e.g., runs, walks, climbs, swims, rides). GNSS receivers 1580 in devices worn by users can provide their location in an emergency. The only concern that needs to be addressed while using a GNSS receiver 1580 in a wearable device is the power consumed because battery power conservation is critical in devices that monitor safety.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special-purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special-purpose computer or similar special-purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any (reasonable) combination of A, B, and/or C, such as AC, AB, BC, AA, AAB, ABC, AABBCCC, or the like.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

In view of this description embodiments may include different combinations of features. Implementation examples are described in the following numbered clauses:

Clause 1. A method for calculating positioning information during water immersion activities, the method comprising: receiving a plurality of Global Navigation Satellite System (GNSS) signals using an antenna of a wearable device, wherein the antenna is located in an exterior portion of the wearable device such that the antenna faces away from a body of a user that wears the wearable device to receive the plurality of GNSS signals; and determining a geographic location of the wearable device based at least in part on the plurality of GNSS signals.

Clause 2. The method of clause 1, wherein the exterior portion of the wearable device comprises a crown of the wearable device.

Clause 3. The method of clause 1, wherein the exterior portion of the wearable device comprises a portion of a band of the wearable device adjacent a face of the wearable device.

Clause 4. The method of clause 1, wherein the exterior portion comprises a face of the wearable device and the antenna comprises a mesh antenna.

Clause 5. The method of any of clauses 1-4, further comprising: accessing information of a plurality of geographic points, the plurality of geographic points defining a swim lane; determining whether the geographic location of the wearable device is outside the defined swim lane; and providing feedback to the user indicating that the geographic location of the wearable device is outside the swim lane.

Clause 6. The method of clause 5, wherein the feedback comprises haptic feedback or audio feedback.

Clause 7. The method of any of clauses 1-6, wherein the antenna is configured to receive the plurality of GNSS signals without the plurality of GNSS signals first passing through an air gap within a housing of the wearable device.

Clause 8. The method of any of clauses 1-7, further comprising providing, to the user via an augmented reality device, lane information, location information, or both of other objects in water.

Clause 9. The method of any of clauses 1-8, further comprising: obtaining a plurality of geographic locations and associated times; and determining one or more characteristics of the water immersion activities based at least in part on the plurality of geographic locations and the associated times.

Clause 10. The method of any of clauses 1-9, further comprising sending, via a wireless link, the geographic location of the wearable device to an electronic device.

Clause 11. The method of any of clauses 1-10, further comprising: identifying a second wearable device that is at least periodically out of water, having a better reception of GNSS signals than the wearable device, or both; receiving a second plurality of GNSS signals using an antenna of the second wearable device; and determining the geographic location of the wearable device based at least in part on the second plurality of GNSS signals.

Clause 12. A wearable device comprising a communication interface, a memory, and one or more processing units communicatively coupled with the communication interface and the memory and configured to cause the wearable device to perform the method of any of clauses 1-11.

Clause 13. A non-transitory computer-readable medium storing a plurality of instructions, the plurality of instructions, when executed on a processor, causing the processor to perform the method of any of clauses 1-11.

Clause 14. A wearable device comprising: a body including a hermetically sealed case and an exterior portion; a processing circuit housed in the hermetically sealed case; and an antenna electrically coupled to the processing circuit, the antenna located at the exterior portion of the body such that, during operations of the wearable device, the antenna faces outwardly to receive a plurality of Global Navigation Satellite System (GNSS) signals at the exterior portion of the body and feeds the plurality of GNSS signals to the processing circuit.

Clause 15. The wearable device of clause 14, wherein the exterior portion of the body comprises: a crown of the wearable device; a circumferential portion of the hermetically sealed case; a portion of a band of the wearable device; or a combination thereof.

Clause 16. The wearable device of clause 14, wherein: the exterior portion of the body comprises a cover that is at least partially transparent to visible light; and the antenna comprises an antenna attached to a surface of the cover or embedded in the cover.

Clause 17. The wearable device of clause 16, wherein: the antenna attached to the surface of the cover or embedded in the cover comprises a mesh, a loop, an inverted F antenna, a directional antenna, an omnidirectional antenna, or a combination thereof; and the surface includes an interior surface or an exterior surface.

Clause 18. The wearable device of any of clauses 14-17, wherein: the antenna is further configured to receive a Wide Area Network (WAN) signal, a Wi-Fi signal, or both; and the wearable device further comprises a filter configured to isolate the plurality of GNSS signals from the WAN signal, the Wi-Fi signal, or both.

Clause 19. The wearable device of any of clauses 14-17, wherein: the antenna is further configured to receive a WAN signal, a Wi-Fi signal, or both; and the wearable device further comprises: an inertial measurement unit configured to measure an orientation of the wearable device; and a switch configured to select, based on the orientation of the wearable device, the plurality of GNSS signals, the WAN signal, the Wi-Fi signal, or a combination of the WAN signal and the Wi-Fi signal to feed to the processing circuit.

Clause 20. The wearable device of any of clauses 14-19, wherein the antenna is electrically coupled to the processing circuit by capacitive coupling or via a conductive wire embedded in the body.

Clause 21. The wearable device of any of clauses 14-20, wherein the antenna is electrically coupled to the processing circuit through a low noise amplifier.

Clause 22. The wearable device of any of clauses 14-21, wherein the antenna includes a circular antenna, a ring-shaped antenna, a patch antenna, a microstrip antenna, a coil antenna, or an antenna array.

Clause 23. The wearable device of any of clauses 14-22, wherein the antenna includes a ground plane configured to be in physical contact with a skin of a user that wears the wearable device.

Clause 24. The wearable device of any of clauses 14-23, wherein the processing circuit is configured to determine a geographic location of the wearable device based at least in part on the plurality of GNSS signals.

Clause 25. The wearable device of clause 24, wherein the processing circuit is further configured to: access information regarding a plurality of geographic points that define a geographic zone; determine, based on the plurality of geographic points, that the geographic location is outside the geographic zone; and provide, in response to determining that the wearable device is outside the geographic zone, feedback to a user of the wearable device.

Clause 26. The wearable device of clause 25, wherein the feedback comprises haptic feedback, audio feedback, visible feedback, or a combination thereof.

Clause 27. The wearable device of any of clauses 24-26, wherein the processing circuit is configured to send, via a wireless link, the geographic location of the wearable device to an external electronic device.

Clause 28. The wearable device of any of clauses 24-27, wherein the processing circuit is configured to: track the geographic location of the wearable device; and determine, based on tracking the geographic location of the wearable device, one or more characteristics of a user of the wearable device, wherein the user is at least partially in water.

Clause 29. The wearable device of any of clauses 14-28, wherein the body of the wearable device is configured to be removably attached to swim goggles, a wetsuit, a head band, or a neck of a user.

Clause 30. The wearable device of any of clauses 14-29, further comprising a pressure sensor configured to measure a depth of the wearable device in water.

Clause 31. The wearable device of any of clauses 14-30, further comprising a second antenna electrically coupled to the processing circuit and configured to receive a second plurality of GNSS signals, wherein the processing circuit is configured to, based on locations, received GNSS signal levels, or both of both the second antenna and the antenna located at the exterior portion of the body, selectively utilize the plurality of GNSS signals received by the antenna located at the exterior portion of the body, the second plurality of GNSS signals received by the second antenna, or both for positioning.

Clause 32. The wearable device of any of clauses 14-31, wherein the processing circuit is configured to: obtain a second plurality of GNSS signals received by a second wearable device; and select the plurality of GNSS signals, the second plurality of GNSS signals, or both for use for a time window.

Clause 33. A method for determining positioning information during water immersion activities, the method comprising: receiving a plurality of Global Navigation Satellite System (GNSS) signals via an antenna on a wearable device; determining a plurality of geographic locations of the wearable device over time based at least in part on the plurality of GNSS signals; storing the plurality of geographic locations and associated times in a memory of the wearable device; measuring a depth of the wearable device based on pressure data measured by a pressure sensor on the wearable device; in response to the measured depth exceeding a threshold depth: determining a historical speed of the wearable device based at least on the plurality of geographic locations and the associated times stored in the memory of the wearable device; determining a direction of motion of the wearable device based at least in part on a magnetic signature received by a magnetometer of the wearable device; determining one or more underwater geographic locations of the wearable device over time using the historical speed and the direction of motion;

and saving the one or more underwater geographic locations of the wearable device to the memory.

Clause 34. The method of clause 33, further comprising: receiving a second plurality of GNSS signals by the antenna of the wearable device; determining an updated position of the wearable device based at least in part of the second plurality of GNSS signals; and storing the updated position of the wearable device in the memory.

Clause 35. The method of clause 33 or 34, further comprising: generating a message comprising the historic speed, the one or more underwater geographic locations and associated time stamps, the direction of motion, or a combination thereof; and sending, via a wireless protocol, the message to an electronic device.

Clause 36. A wearable device comprising a communication interface, a memory, and one or more processing units communicatively coupled with the communication interface and the memory and configured to cause the wearable device to perform the method of any of clauses 33-35.

Clause 37. A non-transitory computer-readable medium storing a plurality of instructions, the plurality of instructions, when executed by a processor, causing the processor to perform the method of any of clauses 33-35.

Clause 38. A method for determining positioning information during water immersion activities, the method comprising: receiving a plurality of Global Navigation Satellite System (GNSS) signals using an antenna on a wearable device; measuring a first received energy of the plurality of GNSS signals during a first dwell period; measuring a second received energy of the plurality of GNSS signals during a plurality of secondary dwell periods, wherein a duration of each of the plurality of secondary dwell periods is shorter than the first dwell period; storing, based at least in part on the second received energy exceeding a first threshold level, the second received energy in a memory; and in response to the first received energy below a second threshold level: harvesting accumulated energy of the plurality of GNSS signals during the plurality of secondary dwell periods in or near a center time and frequency bin to determine a location for the wearable device; and determining, based on the accumulated energy, one or more characteristics of the plurality of GNSS signals during the plurality of secondary dwell periods in the memory.

Clause 39. The method of clause 38, further comprising: receiving a plurality of sensor signals from one or more sensors in the wearable device; determining, based in part on the sensor signals, a position of the wearable device during a swimming stroke; and scheduling a time period for measuring the plurality of GNSS signals based at least in part on the position of the wearable device during the swimming stroke.

Clause 40. A wearable device comprising a communication interface, a memory, and one or more processing units communicatively coupled with the communication interface and the memory and configured to cause the wearable device to perform the method of any of clauses 38-39.

Clause 41. A non-transitory computer-readable medium storing a plurality of instructions, the plurality of instructions, when executed on a processor, causing the processor to perform the method of any of clauses 38-39.

Clause 42. A method for determining positioning information during water immersion activities, the method comprising: receiving a plurality of Global Navigation Satellite System (GNSS) signals using an antenna, wherein the antenna is located in an exterior portion of a wearable device such that the antenna receives the plurality of GNSS signals without the plurality of GNSS signals first passing through an air gap within a housing of the wearable device; determining one or more geographic locations of the wearable device over a period of time based at least in part on the plurality of GNSS signals; measuring one or more depths of the wearable device over the period of time using a pressure sensor on the wearable device; and storing the one or more geographic locations and the one or more depths of the wearable device over the period of time in a memory.

Clause 43. The method of clause 42, further comprising: sending the one or more geographic locations, the one or more depths, or both of the wearable device over the period of time to an electronic device via a wireless protocol.

Clause 44. A wearable device comprising a communication interface, a memory, and one or more processing units communicatively coupled with the communication interface and the memory and configured to cause the wearable device to perform the method of any of clauses 42-43.

Clause 45. A non-transitory computer-readable medium storing a plurality of instructions, the plurality of instructions, when executed on a processor, causing the processor to perform the method of any of clauses 42-43.

Clause 46. A method for determining positioning information during water immersion activities, the method comprising: receiving a plurality of Global Navigation Satellite System (GNSS) signals using an antenna, wherein the antenna is located in an exterior portion of a wearable device such that the antenna receives the plurality of GNSS signals without the plurality of GNSS signals first passing through an air gap within a housing of the wearable device; determining a plurality of geographic locations of the wearable device during a time period based at least in part on the plurality of GNSS signals; storing the plurality of geographic locations and associated times of the wearable device in a memory; determining motion of the wearable device during the time period based on the plurality of geographic locations and the associated times; receiving wireless signals containing a plurality of acceleration signals from one or more motion sensors worn on one or more limbs of a user; determining a movement of the one or more limbs of the user during the time period based in part on the plurality of acceleration signals; and determining an efficiency of a stroke based at least in part on the movement of the one or more limbs of the user and the motion of the wearable device during the time period.

Clause 47. The method of clause 46, wherein the one or more motion sensors include one or more microelectromechanical (MEMS) sensors incorporated into a flipper.

Clause 48. The method of clause 46 or 47, wherein the one or more motion sensors include one or more microelectromechanical (MEMS) sensors incorporated into the wearable device.

Clause 49. The method of any of clauses 46-48, wherein the one or more motion sensors include one or more microelectromechanical (MEMS) sensors incorporated into a flexible band.

Clause 50. A wearable device comprising a communication interface, a memory, and one or more processing units communicatively coupled with the communication interface and the memory and configured to cause the wearable device to perform the method of any of clauses 46-49.

Clause 51. A non-transitory computer-readable medium storing a plurality of instructions, the plurality of instructions, when executed on a processor, cause the processor to perform the method of any of the clauses 46-49.

Clause 52. A method for determining positioning information during water immersion activities, the method comprising: receiving a plurality of Global Navigation Satellite System (GNSS) signals using an antenna, wherein the antenna is located in an exterior portion of a wearable device such that the antenna receives the plurality of GNSS signals without the plurality of GNSS signals first passing through an air gap within a housing of the wearable device; determining a plurality of geographic locations of the wearable device during a time period based at least in part on the plurality of GNSS signals; storing the plurality of geographic locations of the wearable device and associated times in a memory of the wearable device; generating one or more data messages comprising the plurality of geographic locations of the wearable device and the associated times; and sending the one or more data messages to one or more second wearable devices via a sidelink data channel.

Clause 53. The method of clause 52, further comprising: receiving, via the sidelink data channel, one or more second data messages from the one or more second wearable devices, wherein the one or more second data messages comprise a plurality of geographic locations of the one or more second wearable devices.

Clause 54. The method of clause 52 or 53, further comprising providing feedback via the wearable device based in part on the plurality of geographic locations of the one or more second wearable devices.

Clause 55. A wearable device comprising a communication interface, a memory, and one or more processing units communicatively coupled with the communication interface and the memory and configured to cause the wearable device to perform the method of any of clauses 52-54.

Clause 56. A non-transitory computer-readable medium storing a plurality of instructions, the plurality of instructions, when executed on a processor, causing the processor to perform the method of any of clauses 52-54.

Clause 57. A method for calibrating a wearable device during water immersion activities, the method comprising: receiving a plurality of Global Navigation Satellite System (GNSS) signals using an antenna, wherein the antenna is located in an exterior portion of the wearable device such that the antenna receives the plurality of GNSS signals without the plurality of GNSS signals first passing through an air gap within a housing of the wearable device; determining a plurality of geographic locations of the wearable device over a time period based at least in part on the plurality of GNSS signals; storing the plurality of geographic locations of the wearable device and associated times in a memory of the wearable device; measuring an elapsed time for swimming a known distance; and determining a calibration error based on comparing the plurality of geographic locations and the associated times with the elapsed time and the known distance.

Clause 58. A wearable device comprising a communication interface, a memory, and one or more processing units communicatively coupled with the communication interface and the memory and configured to cause the wearable device to perform the method of clause 57.

Clause 59. A non-transitory computer-readable medium storing a plurality of instructions, the plurality of instructions, when executed on a processor, causing the processor to perform the method of clause 57.

Clause 60. A wearable device comprising: means for receiving a plurality of Global Navigation Satellite System (GNSS) signals, wherein the means for receiving the plurality of GNSS signals is located in an exterior portion of the wearable device such that the means for receiving the plurality of GNSS signals faces away from a body of a user that wears the wearable device to receive the plurality of GNSS signals; and means for determining a geographic location of the wearable device based at least in part on the plurality of GNSS signals.

Clause 61. A non-transitory computer-readable medium having instructions stored thereon, the instructions, when executed by one or more processing units, causing the one or more processing units to perform functions comprising: receiving, via an antenna of a wearable device, a plurality of Global Navigation Satellite System (GNSS) signals, wherein the antenna is located in an exterior portion of the wearable device such that the antenna faces away from a body of a user that wears the wearable device to receive the plurality of GNSS signals; and determining a geographic location of the wearable device based at least in part on the plurality of GNSS signals

What is claimed is:

1. A method for calculating positioning information during water immersion activities, the method comprising:
receiving a plurality of Global Navigation Satellite System (GNSS) signals using an antenna of a first wearable device, wherein the antenna is located in an exterior portion of the first wearable device such that the antenna faces away from a body of a user that wears the first wearable device to receive the plurality of GNSS signals;
receiving a Wide Area Network (WAN) signal, a Wi-Fi signal, or both;
receiving:
an orientation of the first wearable device measured by an inertial measurement unit;
a depth of the first wearable device in water measured by a pressure sensor; or
both the orientation and the depth of the first wearable device; and
determining a geographic location of the first wearable device using wireless signals, wherein the wireless signals are selected based on the orientation, wherein the wireless signals comprise: the plurality of GNSS signals, the WAN signal, the Wi-Fi signal, or any combination thereof,
wherein the exterior portion in which the antenna is located comprises:

a crown of the first wearable device;
a display of the first wearable device;
a screen of the first wearable device;
a window of the first wearable device;
a band of the first wearable device; or
any combination thereof.

2. The method of claim 1, further comprising:
accessing information of a plurality of geographic points, the plurality of geographic points defining a swim lane;
determining whether the geographic location of the first wearable device is outside the defined swim lane; and
providing feedback to the user indicating that the geographic location of the first wearable device is outside the swim lane.

3. The method of claim 2, wherein the feedback comprises haptic feedback or audio feedback.

4. The method of claim 1, wherein the antenna is configured to receive the plurality of GNSS signals without the plurality of GNSS signals first passing through an air gap within a housing of the first wearable device.

5. The method of claim 1, further comprising providing, to the user via an augmented reality device, lane information, location information, or both of other objects in water.

6. The method of claim 1, further comprising:
obtaining a plurality of geographic locations and associated times; and
determining one or more characteristics of the water immersion activities based at least in part on the plurality of geographic locations and the associated times.

7. The method of claim 1, further comprising sending, via a wireless link, the geographic location of the first wearable device to an electronic device.

8. The method of claim 1, further comprising:
identifying a second wearable device that is at least periodically out of water, having a better reception of GNSS signals than the first wearable device, or both;
receiving a second plurality of GNSS signals using an antenna of the second wearable device; and
determining the geographic location of the first wearable device based at least in part on the second plurality of GNSS signals.

9. A wearable device comprising:
a body including a hermetically sealed case and an exterior portion;
a processing circuit housed in the hermetically sealed case;
an antenna electrically coupled to the processing circuit, the antenna located at the exterior portion of the body such that, during operations of the wearable device, the antenna faces outwardly to receive a first plurality of Global Navigation Satellite System (GNSS) signals at the exterior portion of the body and feeds the first plurality of GNSS signals to the processing circuit, wherein the antenna is further configured to receive a Wide Area Network (WAN) signal, a Wi-Fi signal, or both, and wherein the exterior portion in which the antenna is located comprises:
a crown of the body;
a display of the body;
a screen of the body;
a window of the body;
a band of the body; or
any combination thereof; and
an inertial measurement unit configured to measure an orientation of the wearable device, a pressure sensor configured to measure a depth of the wearable device in water, or both the inertial measurement unit and the pressure sensor,
wherein the processing circuit is configured to:
determine a geographic location of the first wearable device using wireless signals, wherein the wireless signals are selected based on the orientation, wherein the wireless signals comprise: the first plurality of GNSS signals, the WAN signal, the Wi-Fi signal, or any combination thereof.

10. The wearable device of claim 9, wherein:
the exterior portion of the body comprises a cover that is at least partially transparent to visible light; and
the antenna comprises an antenna attached to a surface of the cover or embedded in the cover.

11. The wearable device of claim 10, wherein:
the antenna attached to the surface of the cover or embedded in the cover comprises a mesh, a loop, an inverted F antenna, a directional antenna, an omnidirectional antenna, or any combination thereof; and
the surface includes an interior surface or an exterior surface.

12. The wearable device of claim 9, wherein:
the wearable device further comprises a filter configured to separate the first plurality of GNSS signals from the WAN signal, the Wi-Fi signal, or both.

13. The wearable device of claim 9, further comprising:
a switch configured to select, based on the orientation, the depth, or both the orientation and the depth of the wearable device, the first plurality of GNSS signals, the WAN signal, the Wi-Fi signal, or a combination of the WAN signal and the Wi-Fi signal to feed to the processing circuit.

14. The wearable device of claim 9, wherein the antenna is electrically coupled to the processing circuit by capacitive coupling or via a conductive wire embedded in the body.

15. The wearable device of claim 9, wherein the antenna is electrically coupled to the processing circuit through a low noise amplifier.

16. The wearable device of claim 9, wherein the antenna includes a circular antenna, a ring-shaped antenna, a patch antenna, a microstrip antenna, a coil antenna, or an antenna array.

17. The wearable device of claim 9, wherein the antenna includes a ground plane configured to be in physical contact with a skin of a user that wears the wearable device.

18. The wearable device of claim 9, wherein the processing circuit is further configured to:
access information regarding a plurality of geographic points that defines a geographic zone;
determine, based on the plurality of geographic points, that the geographic location is outside the geographic zone; and
provide, in response to determining that the wearable device is outside the geographic zone, feedback to a user of the wearable device.

19. The wearable device of claim 18, wherein the feedback comprises haptic feedback, audio feedback, visible feedback, or any combination thereof.

20. The wearable device of claim 9, wherein the processing circuit is configured to send, via a wireless link, the geographic location of the wearable device to an external electronic device.

21. The wearable device of claim 9, wherein the processing circuit is configured to:
track the geographic location of the wearable device; and determine, based on tracking the geographic location of the wearable device, one or more characteristics of a user of the wearable device, wherein the user is at least partially in water.

22. The wearable device of claim 9, wherein the body of the wearable device is configured to be removably attached to swim goggles, a wetsuit, a head band, or a neck of a user.

23. The wearable device of claim 9, further comprising a second antenna electrically coupled to the processing circuit and configured to receive a second plurality of GNSS signals, wherein the processing circuit is configured to, based on locations, received GNSS signal levels, or both of both the second antenna and the antenna located at the exterior portion of the body, selectively utilize the first plurality of GNSS signals received by the antenna located at the exterior portion of the body, the second plurality of GNSS signals received by the second antenna, or both for positioning.

24. The wearable device of claim 9, wherein the processing circuit is configured to:
obtain a second plurality of GNSS signals received by a second wearable device; and
select the first plurality of GNSS signals, the second plurality of GNSS signals, or both for use for a time window.

25. A wearable device comprising:
means for receiving a plurality of Global Navigation Satellite System (GNSS) signals, wherein the means for receiving the plurality of GNSS signals is located in an exterior portion of the wearable device such that the means for receiving the plurality of GNSS signals faces away from a body of a user that wears the wearable device to receive the plurality of GNSS signals;
means for receiving a Wide Area Network (WAN) signal, a Wi-Fi signal, or both;
means for receiving:
an orientation of the wearable device measured by an inertial measurement unit;
a depth of the wearable device in water measured by a pressure sensor; or
both the orientation and the depth of the wearable device; and
means for determining a geographic location of the first wearable device using wireless signals, wherein the wireless signals are selected based on the orientation, wherein the wireless signals comprise: the plurality of GNSS signals, the WAN signal, the Wi-Fi signal, or any combination thereof,
wherein the exterior portion in which the means for receiving the plurality of GNSS signals is located comprises:
a crown of the wearable device;
a display of the wearable device;
a screen of the wearable device;
a window of the wearable device;
a band of the wearable device; or
any combination thereof.

26. A non-transitory computer-readable medium having instructions stored thereon, the instructions, when executed by one or more processing units, causing the one or more processing units to:
receive, via an antenna of a wearable device, a plurality of Global Navigation Satellite System (GNSS) signals, wherein the antenna is located in an exterior portion of the wearable device such that the antenna faces away from a body of a user that wears the wearable device to receive the plurality of GNSS signals;
receive a Wide Area Network (WAN) signal, a Wi-Fi signal, or both;
receive:
an orientation of the wearable device measured by an inertial measurement unit;
a depth of the wearable device in water measured by a pressure sensor; or
both the orientation and the depth of the wearable device; and
determine a geographic location of the first wearable device using wireless signals, wherein the wireless signals are selected based on the orientation, wherein the wireless signals comprise: the plurality of GNSS signals, the WAN signal, the Wi-Fi signal, or any combination thereof,
wherein the exterior portion in which the antenna is located comprises:
a crown of the wearable device;
a display of the wearable device;
a screen of the wearable device;
a window of the wearable device;
a band of the wearable device; or
any combination thereof.

* * * * *